US008882584B2

(12) United States Patent
Walker et al.

(10) Patent No.: US 8,882,584 B2
(45) Date of Patent: Nov. 11, 2014

(54) METHOD AND APPARATUS FOR BONUS ROUND PLAY

(71) Applicant: IGT, Reno, NV (US)

(72) Inventors: Jay S. Walker, Ridgefield, CT (US); James A. Jorasch, New York, NY (US); Russell P. Sammon, San Francisco, CA (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 13/762,047

(22) Filed: Feb. 7, 2013

(65) Prior Publication Data

US 2013/0150145 A1 Jun. 13, 2013

Related U.S. Application Data

(63) Continuation of application No. 13/343,159, filed on Jan. 4, 2012, now Pat. No. 8,393,957, which is a continuation of application No. 12/121,065, filed on May 15, 2008, now Pat. No. 8,105,156, which is a continuation of application No. 10/414,511, filed on Apr. 15, 2003, now Pat. No. 7,275,990.

(60) Provisional application No. 60/373,748, filed on Apr. 18, 2002.

(51) Int. Cl.
*A63F 9/24* (2006.01)
*G06Q 30/02* (2012.01)
*G07F 17/32* (2006.01)
*G06F 17/30* (2006.01)

(52) U.S. Cl.
CPC ........ *G07F 17/3267* (2013.01); *G06Q 30/0209* (2013.01); *G07F 17/3227* (2013.01); *G07F 17/3244* (2013.01); *G07F 17/3248* (2013.01); *G06F 17/30283* (2013.01); *G07F 17/3262* (2013.01); *G07F 17/32* (2013.01); *G06Q 30/0254* (2013.01); *G07F 17/3288* (2013.01); *G06Q 30/0272* (2013.01)
USPC .................... 463/25; 463/16; 463/20; 463/29

(58) Field of Classification Search
USPC ........... 463/12–1, 16, 17–19, 20, 21, 25, 423, 463/42, 29
See application file for complete search history.

(56) References Cited

U.S. PATENT DOCUMENTS 4,805,907 A 2/1989 Hagiwara
5,042,809 A 8/1991 Richardson
(Continued)

OTHER PUBLICATIONS

"Igames Entertainment Debuts Slot Machine Security Device at Las Vegas Global Gaming Expo," PR Newswire, Oct. 22, 2002.
(Continued)

*Primary Examiner* — Damon Pierce
(74) *Attorney, Agent, or Firm* — Neal, Gerber & Eisenberg LLP

(57) ABSTRACT

Methods and apparatus are provided for enabling a player to take a tour of a secondary game at a game machine. In one embodiment, a method is provided that includes offering to enable entry of a player into a bonus round of a game machine in exchange for a fee, receiving the fee from the player, and enabling entry of the player into the bonus round. The method further includes receiving an indication of at least one player selection during the bonus round, and determining an outcome based on the at least one player selection. In other embodiments, the method includes providing a prize to the player based on the outcome.

24 Claims, 11 Drawing Sheets

(56) References Cited

U.S. PATENT DOCUMENTS

| | | | |
|---|---|---|---|
| 5,833,538 | A | 11/1998 | Weiss |
| 5,916,024 | A | 6/1999 | Von Kohorn |
| 6,102,799 | A | 8/2000 | Stupak |
| 6,159,098 | A | 12/2000 | Slomiany et al. |
| 6,165,070 | A | 12/2000 | Nolte et al. |
| 6,174,234 | B1 | 1/2001 | Seibert, Jr. et al. |
| 6,309,300 | B1 | 10/2001 | Glavich |
| 6,315,665 | B1 | 11/2001 | Faith |
| 6,368,216 | B1 | 4/2002 | Hedrick et al. |
| 6,406,369 | B1 | 6/2002 | Baerlocher et al. |
| 6,439,995 | B1 | 8/2002 | Hughs-Baird et al. |
| 6,454,649 | B1 | 9/2002 | Mattice et al. |
| 6,491,584 | B2 | 12/2002 | Graham et al. |
| 6,508,709 | B1 | 1/2003 | Karmarkar |
| 6,511,375 | B1 | 1/2003 | Kaminkow |
| 6,537,152 | B2 | 3/2003 | Seelig et al. |
| 6,609,974 | B2 | 8/2003 | Mead et al. |
| 6,620,045 | B2 | 9/2003 | Berman et al. |
| 6,769,986 | B2 | 8/2004 | Vancura |
| 6,918,834 | B2 | 7/2005 | Vancura |
| 6,939,223 | B1 | 9/2005 | Jones |
| 7,275,990 | B2 | 10/2007 | Walker et al. |
| 7,666,090 | B2 | 2/2010 | Hettinger |
| 7,890,365 | B2 | 2/2011 | Hettinger |
| 7,908,169 | B2 | 3/2011 | Hettinger |
| 2001/0004606 | A1* | 6/2001 | Tracy et al. ............ 463/16 |
| 2001/0004607 | A1 | 6/2001 | Olsen |
| 2002/0010025 | A1* | 1/2002 | Kelly et al. ............ 463/42 |
| 2002/0025848 | A1* | 2/2002 | Graham et al. ............ 463/25 |
| 2002/0039921 | A1 | 4/2002 | Rowe et al. |
| 2002/0069106 | A1 | 6/2002 | Shopsowitz |
| 2002/0107072 | A1 | 8/2002 | Giobbi |
| 2002/0155873 | A1 | 10/2002 | Berman et al. |
| 2003/0032479 | A1 | 2/2003 | LeMay et al. |
| 2003/0054873 | A1 | 3/2003 | Peterson |
| 2003/0064782 | A1 | 4/2003 | Beaulieu |
| 2003/0083943 | A1 | 5/2003 | Adams et al. |
| 2003/0100361 | A1 | 5/2003 | Sharpless et al. |
| 2003/0109310 | A1 | 6/2003 | Heaton et al. |
| 2004/0102243 | A1 | 5/2004 | Olsen |
| 2004/0242319 | A1 | 12/2004 | Walker et al. |
| 2005/0096114 | A1 | 5/2005 | Cannon et al. |
| 2005/0101383 | A1 | 5/2005 | Wells |
| 2005/0233800 | A1 | 10/2005 | Jones |
| 2008/0214263 | A1 | 9/2008 | Walker et al. |

OTHER PUBLICATIONS

Peterson, David, "Gambling games are a safe bet," The Australian, Oct. 19, 1999, Section: Features, p. C18.

Partial U.S. Patent No. 6,491,584 submitted with Third Party Submission in Published Application Under 37 C.F.R. § 1.99 for U.S. Appl. No. 13/343,159 (3 pages) filed date Mar. 29, 2001.

Third Party Submission in Published Application Under 37 C.F.R. § 1.99 filed for U.S. Appl. No. 13/343,159, dated Jul. 2, 2012 (2 pages).

Website: "Captain Cooks Casinos," (http //captaincookscasinos. com/), download date: Apr. 8, 2003.

Website: "Starluck Casino Online," (http //www.starluck camino. com/slcasino/English/tour.html), download date: Apr. 7, 2003.

Website: Wallroth, Johannes, "An exciting and entertaining card game . . . ", (http //www.freewarehomecom/Games/Cards_p.html), Nov. 14, 1999.

"WMS Gaming's MONOPOLY Slot Machines Named 1999's Most Innovative Gaming Product at the American Gaming, Lodging and Leisure Summit," Business Wire, Jan. 14, 1999.

* cited by examiner

| PLAYER IDENTIFIER 402 | NAME 404 | TOOK TOUR OF GOLDEN EGG BONUS ROUND? 406 | MOST RECENT TOUR OF WHEEL OF RICHES BONUS ROUND 408 | NUMBER OF TOURS OF RASCALLY RABBIT BONUS ROUND 410 |
|---|---|---|---|---|
| PLAY-028345525-01 | ANNE RED | YES | N/A | 1 |
| PLAY-028345525-02 | JEFF YELLOW | NO | 4/1/02 5:20PM | 0 |
| PLAY-028345525-03 | JIM BLUE | NO | 3/15/02 8:12PM | 3 |
| PLAY-028345525-04 | ALICE ORANGE | YES | N/A | 2 |
| PLAY-028345525-05 | JOHN GREEN | YES | 3/28/02 1:56PM | 1 |
| PLAY-028345525-06 | JEN PURPLE | NO | 3/20/02 8:15PM | 0 |

| LESSON IDENTIFIER 502 | TRIGGER 504 | TEXT OF LESSON 506 |
|---|---|---|
| LESSON-12890-01 | START OF FIRST BONUS ROUND ON THE TOUR | "THE GOAL OF THIS GAME IS TO HATCH BABY CHICKENS AND FIND THE GOLDEN EGG. YOU WANT TO AVOID CRACKING OPEN EGGS WITH ALLIGATORS IN THEM." |
| LESSON-12890-02 | PLAYER PICKS AN EGG THAT HAS A BABY CHICKEN IN IT | "CONGRATULATIONS! YOU HATCHED A BABY CHICKEN! FOR EACH BABY CHICKEN THAT YOU HATCH DURING A BONUS ROUND, YOU GET 10 COINS." |
| LESSON-12890-03 | PLAYER PICKS AN EGG THAT HAS AN ALLIGATOR IN IT | "IF YOU CRACK OPEN AN EGG WITH AN ALLIGATOR IN IT, THEN THE BONUS ROUND ENDS." |
| LESSON-12890-04 | PLAYER FINDS THE GOLDEN EGG | "IF YOU FIND THE GOLDEN EGG DURING A BONUS ROUND, THEN YOU WIN 100 COINS." |
| LESSON-12890-05 | PLAYER DOES NOTHING FOR MORE THAN 5 SECONDS | "TO CRACK OPEN AN EGG, USE YOUR FINGER TO TOUCH THE EGG ON THE VIDEO SCREEN." |
| LESSON-12890-06 | PLAYER FINDS THE GOLDEN EGG | "IF YOU FIND THE GOLDEN EGG, THEN YOUR BONUS ROUND IS OVER." |
| LESSON-12890-07 | START OF SECOND BONUS ROUND ON THE TOUR | "TO WIN THE MOST MONEY, YOU WANT TO HATCH ALL THE BABY CHICKENS AND THEN FIND THE GOLDEN EGG." |

500

METHOD AND APPARATUS FOR BONUS ROUND PLAY

PRIORITY CLAIM

This application is a continuation of, claims priority to and the benefit of U.S. patent application Ser. No. 13/343,159, filed on Jan. 4, 2012, which is a continuation of, claims priority to and the benefit of U.S. patent application Ser. No. 12/121,065, filed on May 15, 2008, now U.S. Pat. No. 8,105,156, which is a continuation of, claims priority to and the benefit of U.S. patent application Ser. No. 10/414,511, filed on Apr. 15, 2003, now U.S. Pat. No. 7,275,990, which claims priority to and the benefit of U.S. Provisional Patent Application No. 60/373,748, filed on Apr. 18, 2002, the entire contents of each are incorporated by reference herein.

CROSS-REFERENCE TO RELATED U.S. APPLICATIONS

This application is also related to commonly-owned U.S. patent application Ser. No. 11/425,296, entitled "METHOD AND APPARATUS FOR BONUS ROUND PLAY", filed Jun. 20, 2006; and to commonly-owned U.S. patent application Ser. No. 10/001,089, entitled "GAME MACHINE FOR A FLAT RATE PLAY SESSION AND METHOD OF OPERATING SAME", filed Nov. 2, 2001, which issued on Nov. 28, 2006, the entire contents of each are incorporated by reference herein. This application is also related to commonly-owned U.S. patent application Ser. No. 13/762,058, entitled "METHOD AND APPARATUS FOR BONUS ROUND PLAY," filed on Feb. 7, 2013.

FIELD OF THE INVENTION

The present invention relates generally to apparatus and methods for game playing.

BACKGROUND OF THE INVENTION

Game playing may be based on skill and/or based on chance. Some games are associated with one or more secondary games, such as a bonus game, a bonus mode, or a bonus round. Typically, a player may be able to qualify to play a bonus game based on one or more outcomes in a primary game, such as in a basic mode or a qualifying mode. A bonus round may be played in accordance with a set of rules that is different from those of a primary game, and may be accompanied by displays, colors, sounds, animated sequences, game play and/or prizes that are not part of the primary game. In some games, a player must achieve a particular outcome (or outcomes) (e.g., a qualifying outcome, a "start-bonus" outcome) during the primary game in order to qualify for entry into a bonus game. In some games, a bonus mode may be automatically initiated upon a player's achieving a winning outcome (or some other qualifying outcome(s)) in a qualifying round.

Well-known examples of bonus games associated with games of chance include, without limitation, (i) one or more free spins of a set of reels (that may be different from a set of reels used in a primary slot machine game); (ii) a game requiring a player to select one or more of a plurality of selectable elements (e.g., in order to reveal a bonus prize); (iii) a video, audio and/or animated event that awards a bonus prize to a player based on the event; and (iv) one or more free card games (that may be different from a primary card game).

Game machines (e.g., reeled slot machines or video poker machines) generate more than $15 billion per year in revenue for casinos in the United States alone. This figure accounts for more than half of the gaming revenue for a typical United States casino. The situation is similar in other countries in which game machines are popular, such as Europe and Australia. Accordingly, casinos and other operators of game machines are interested in promoting the use of game machines in order to maintain or increase revenues.

At a typical game machine, a bonus round is usually played less often than a machine's primary game. In fact, typically a player may play several rounds of a primary game without qualifying for the associated secondary game. For example, a player can wager on many handle pulls in a slot machine game without achieving a reel combination required to start a bonus mode.

Accordingly, some players may not get to experience some aspects of a secondary game as quickly as they would like, as often as they would like, or at all. Some players may become discouraged by or frustrated with the amount of time and/or money they have spent playing a game machine without qualifying for a bonus round. A player who fails to qualify for a bonus round on a game machine may experience a large net loss playing only the primary game. For example, with respect to some gaming devices, a large portion of the expected payback of the machine may be received in the form of payouts during the bonus round. In addition, some players may not even be aware of the size or types of prizes that may be available in a bonus round.

Further, some players may not understand how a bonus round is played, and may be concerned that they will play poorly if they do get into the bonus round. Accordingly, some players may avoid or stop playing a game machine and/or a primary game if they are uninformed about or do not fully appreciate the bonus round experience, if they feel uncomfortable about playing a bonus game, and/or if they do not recognize the potential benefits of getting into a bonus round.

BRIEF DESCRIPTION OF THE DRAWINGS

FIG. 4 is a tabular representation of an exemplary player database of one or more embodiments of the present invention.

FIG. 5 is a tabular representation of an exemplary lesson database of one or more embodiments of the present invention.

DETAILED DESCRIPTION OF THE INVENTION

Figure 1:
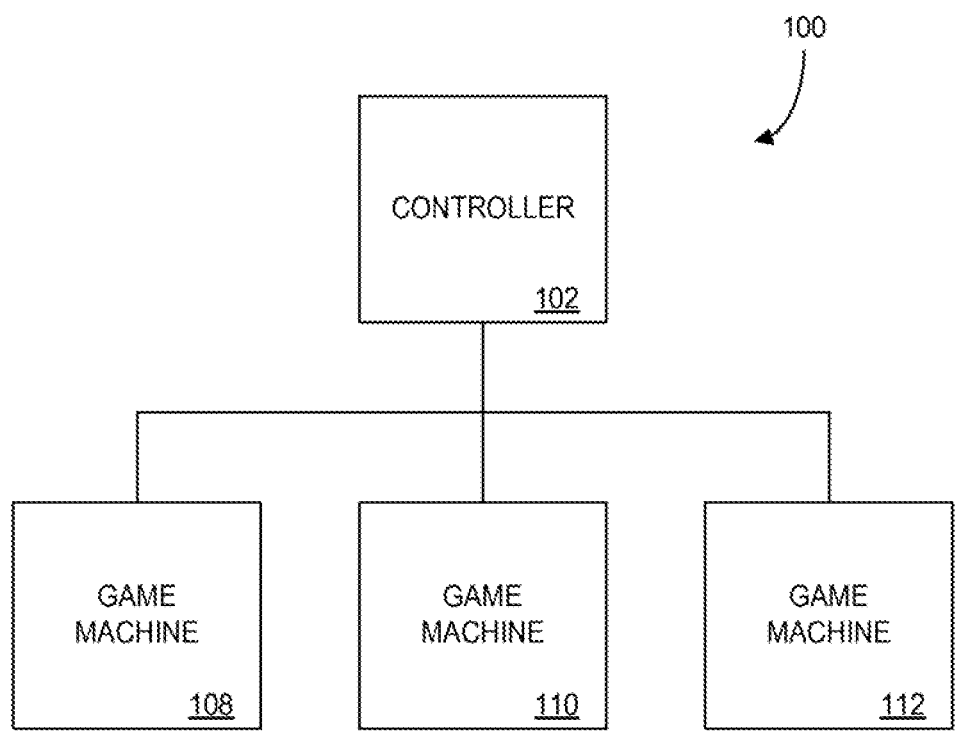
FIG. 1 is a block diagram of an exemplary system of one or more embodiments of the present invention.

Various embodiments of the present invention are described herein with reference to the accompanying drawings. The left most digit(s) of a reference numeral typically identifies the figure in which the reference numeral first appears.

Applicants have recognized that, in some embodiments, allowing a player to experience some of the game play, excitement, and/or operation of one or more secondary games can be advantageous. Applicants have also recognized that various parties, such as operators and manufacturers of game machines, may benefit from being allowed to provide a promotional experience, such as a tour or demonstration of a secondary game, to players. For example, if a player is permitted to participate in a tour of a bonus round, the player may be more interested generally in playing games that include secondary games, and may also be less likely to stop playing a primary game that includes a secondary game.

Applicants have also recognized that, in some embodiments, it would be advantageous to provide a player with a benefit for experiencing a promotion, demonstration, tutorial, or tour of one or more secondary games. For example, the potential of receiving a benefit may encourage some players to take a tour of a slot machine bonus game.

Applicants have also recognized that, in some embodiments, many players would find it appealing to be able to learn about a bonus game on a game machine in a manner that is enjoyable, convenient, and of little or no cost to the player.

Applicants have further recognized that, in some embodiments, many types of players would find it appealing to participate in a promotion, demonstration, tutorial, or tour of a secondary game that is interactive. For example, some types of players would find it appealing to be able to make choices, selections, or decisions during a promotion of a secondary game (e.g., as if the player had qualified conventionally for the secondary game in the primary game). Similarly, some types of players would find it appealing to be able to observe an outcome resulting, directly or indirectly, from a decision made by the player during the promotion of the secondary game.

Applicants have also recognized that many types of players would find it appealing, in some embodiments, to receive information and/or a demonstration about how to play a secondary game. Applicants have further recognized that many types of players would find it appealing, in some embodiments, to receive information about how to play a secondary game while participating in the secondary game.

Applicants have also recognized that, in some embodiments, it would be advantageous to permit a player to win one or more prizes during a tour of a secondary game. For example, providing a payout to a player during a tour or promotion of a bonus round may add to the excitement of the tour. Applicants have further recognized that, in some embodiments, the potential of winning a prize during a tour of a bonus round may encourage some players to take a tour.

Applicants have further recognized that, in some embodiments, allowing a player to experience play of a bonus round on a game machine, without first having to qualify during play of a primary game, can be advantageous. For example, some players may find it appealing to be able to play a bonus round of a slot machine game without first having to achieve a qualifying reel spin or other qualifying outcome.

Applicants have also recognized that, in some embodiments, it may be advantageous to provide a reduced prize to a player during a tour of a secondary game, relative to the prize that would be available to the player during normal play of the secondary game (e.g., based on an outcome in a bonus round). For example, some game machine operators may find it appealing to be able to provide a prize to a player during a tour but to also decrease a cost of providing the tour to a player by providing a reduced prize.

Applicants have further recognized that, in some embodiments, it may be advantageous to prevent a player from participating in a tour or other promotion of a bonus round.

System

Referring now to FIG. 1, a system 100 according to various embodiments of the present invention includes controller 102 that is in communication with one or more game machines 108, 110, 112. In operation, the controller 102 may function under the control of a casino or other entity that may also control one or more of the game machines 108, 110, 112. For example, the controller 102 may be a slot server in a casino's slot machine network. In some embodiments, the controller and a gaming machine may be one and the same.

Each of the controller 102 and the game machines 108, 110, 112 may comprise one or more computing devices, such as those based on the INTEL® PENTIUM® microprocessor, adapted to communicate with one another, and/or may comprise one or more of: a personal computer, a portable type of computer, a laptop computer, a palm-top computer, a wearable computer, a handheld computer, and/or a Personal Digital Assistant (PDA). Other equivalent devices capable of performing the methods specified herein are well known in the art.

Any number of game machines may be in communication with the controller 102. The number of each depicted in FIG. 1 is solely for purposes of illustration. The controller 102 may be physically proximate to one or more of the game machines 108, 110, 112, or may be geographically remote from one or more of the game machines. Similarly, each of the game machines 108, 110, 112 may be physically proximate to another game machine or may be geographically remote from another game machine. The controller 102 and the game machines 108, 110, 112 may each include one or more input devices (not pictured) and/or output devices (not pictured).

The controller 102 and the game machines 108, 110, 112 may communicate with each other directly and/or via a network, including, without limitation, the Internet, an intranet, wireless network protocol, local area network (LAN) or a combination thereof; through a Web site maintained by the controller 102 on a remote server; and/or over an on-line data network including, without limitation, commercial on-line service providers, bulletin board systems, routers, gateways, and the like. In some embodiments, devices may communicate with each other over local area networks, including Ethernet, Token Ring, and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like. Communication between any two devices may be encrypted, as deemed practicable for the desired application.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 102 may function as a "Web server" that presents and/or generates Web pages or other documents typically stored on network-connected computers accessible (e.g., via an intranet, via the World Wide Web) using protocols such as, e.g., the hyper-text transfer protocol (HTTP). Such documents typically include one or more hyper-text markup language (HTML) files, associated graphics, and script files. A Web server allows communication with the controller 102 in a manner known in the art. In some embodiments, one or more of the game machines 108, 110, 112 may use a Web browser, such as NAVIGATOR® published by NETSCAPE®, for accessing HTML forms generated or maintained by or on behalf of the controller 102, FIG. 1 depicts only an exemplary embodiment of the invention. Other arrangements of devices to perform various methods specified herein will be readily appreciated by those of skill in the art.

Generally, any of the game machines 108, 110, 112 includes hardware, software, or both, to support operations in accordance with one or more embodiments of the present invention, such as offering or providing a tour of a bonus round, in addition to supporting the primary functionality of the game machine (e.g., providing one or more games of chance and/or skill). For example, game machines 108, 110, 112 may offer a primary slot machine game and a secondary game, such as a three-reeled slot game and its corresponding bonus round, in addition to being fitted with appropriate electronic, mechanical, software and/or electromechanical means for offering, enabling, and/or executing a tour of the secondary game.

In operation, any of the game machines 108, 110, 112 may exchange information (e.g., information about a player) via the controller 102. The game machines 108, 110, 112 may provide information to the controller 102. The controller 102 may provide information to the game machines 108, 110, 112. The controller 102 also may provide various control signals to the game machines 108, 110, 112, directing them to present offers, display game information, generate game outcomes, provide payouts to players, etc.

In some embodiments of the present invention, some operations are performed by a game machine, and other operations are performed by the controller 102. Alternatively, game machines 108, 110, 112 may not include any hardware and/or software to support operations of the present invention, except to merely receive and respond to a signal from the controller 102 (e.g., a signal directing the game machine to dispense a payout).

Devices
Controller

Figure 2:
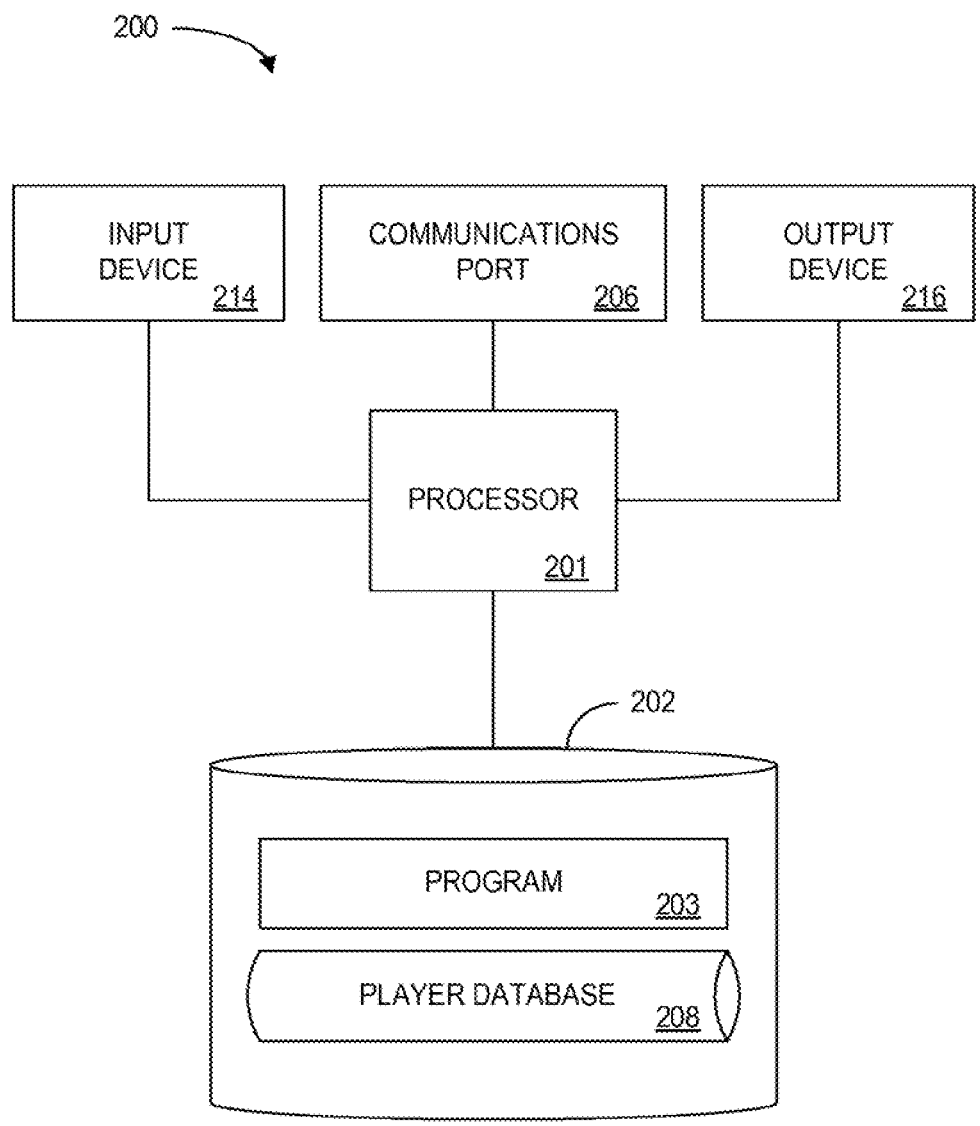
FIG. 2 is a block diagram of an exemplary controller of one or more embodiments of the present invention.

FIG. 2 illustrates are embodiment of the controller 102 (FIG. 1). The exemplary controller 200 of FIG. 2 may be implemented as a system controller, a dedicated hardware circuit, an appropriately programmed general-purpose computer, or any other appropriate device including, without limitation, electronic, mechanical or electro-mechanical devices. The controller 200 is operative to execute various methods of the present invention. For example, some or all of the processes for providing a tour of a bonus round may be carried out by the controller 200.

The controller 200 of the illustrated embodiment comprises a processor 201, such as one or more INTEL® PENTIUM® microprocessors. The processor 201 may include or be coupled to one or more clocks or timers (not pictured), and/or one or more communication ports 206 through which the processor 201 may communicate with other devices, such as the game machines 108, 110, 112. The communication port 206 may be, without limitation, a serial port, modem, wireless transmitter/receiver, or the like.

The processor 201 is in communication with a data storage device 202, The data storage device 202 comprises, for example, magnetic memory, optical memory, semiconductor memory, or any combination thereof. The data storage device 202 may also include, for example, one or more additional processors, communication ports, Random Access Memory (RAM), Read-Only Memory (ROM), a compact disc and/or a hard disk. The processor 201 and the storage device 202 may each be, for example: (i) located entirely within a single computer or other computing device; or (ii) connected to each other by a remote communication medium including, without limitation, a serial port cable, a LAN, a telephone line, a fiber optic connection, a network connection, or a radio frequency transceiver. In some embodiments, the controller 200 may comprise one or more computing devices that are connected to a remote server computer operative for maintaining databases.

The data storage device 202 stores a program 203 for controlling the processor 201. The processor 201 performs instructions of the program 203 (e.g., computer program code and/or a computer program product), and thereby operates in accordance with the present invention, and particularly in accordance with the methods described in detail herein. The program 203 may be stored in a compressed, uncompiled and/or encrypted format, as well as in a variety of other forms known in the art. The program 203 furthermore includes program elements that may be necessary, including, without limitation, an operating system, a database management system and "device drivers" for allowing the processor 201 to interface with one or more peripheral devices. Appropriate program elements are well known to those skilled in the art, and need not be described in detail herein.

According to some embodiments of the present invention, the instructions of the program 203 may be read into a main memory from another computer-readable medium, such as into RAM from a hard drive or ROM. Execution of sequences of the instructions in program 203 may cause the processor 201 to perform any of various process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware, firmware, and/or software.

Further, the program 203 is operative to execute a number of modules or subroutines including, but not limited to: (i) one or more routines to identify a player at a game machine as a potential candidate to be offered a tour of a secondary game; (ii) one or more routines to receive information about a player; (iii) one or more routines to offer a tour of a secondary game to a player; (iv) one or more routines to determine if a player accepts an offer for a tour; (v) one or more routines to determine an outcome in a secondary game; (vi) one or more routines to determine whether an outcome occurred during normal play of a secondary game or during a tutorial for the secondary game; (vii) one or more routines to determine a prize based on whether an outcome in a secondary game occurred during normal play or occurred during a tour of the secondary game; (viii) one or more routines to signal game machines 108, 110, 112 to dispense a payout to a player; (ix) one or more routines to signal a game machine to provide a benefit to a player; (x) one or more routines to signal a game machine to prompt a player to take a tour; (xi) one or more routines to determine a lesson to provide to a player; (xii) one or more routines to facilitate and control communications between one or more game machines and the controller 200 and/or communications among the game machines; (xiii) one or more routines to prevent a player from touring a game machine; and (xiv) one or more routines to control databases or software objects that track information regarding players, lessons for secondary games, prizes for secondary games and game machines 108, 110, 112. Examples of these routines and their operation are described in detail below in conjunction with the flowcharts depicted in FIGS. 7-11.

The storage device 202 also stores a player database 208. The database is described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number and/or content of the databases can be different from those illustrated herein. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art.

The processor 201 may also be in communication with at least one input device 214, which may be used to receive input from an operator (e.g., a casino employee) or other user of the controller 200. Input device 214 may comprise any number or combination of a variety of well-known devices, including, without limitation: a button, a touch screen, a keypad, a pointer device (e.g., a mouse, a trackball), a microphone, a video camera, and a keyboard. Other types of input devices are described herein; others will be readily apparent to those skilled in the art.

The processor 201 may also be in communication with at least one output device 216, which may be used to communicate information to an operator or other user of the controller 200. Output device 216 may comprise any number or combination of a variety of well-known devices, including, without limitation: a display device, a light-emitting diode (LED), an audio speaker, a printer, and an infra-red port (e.g., for communicating with a handheld device). Other types of output devices are described herein; others will be readily apparent to those skilled in the art.

Game Machine

Figure 3:
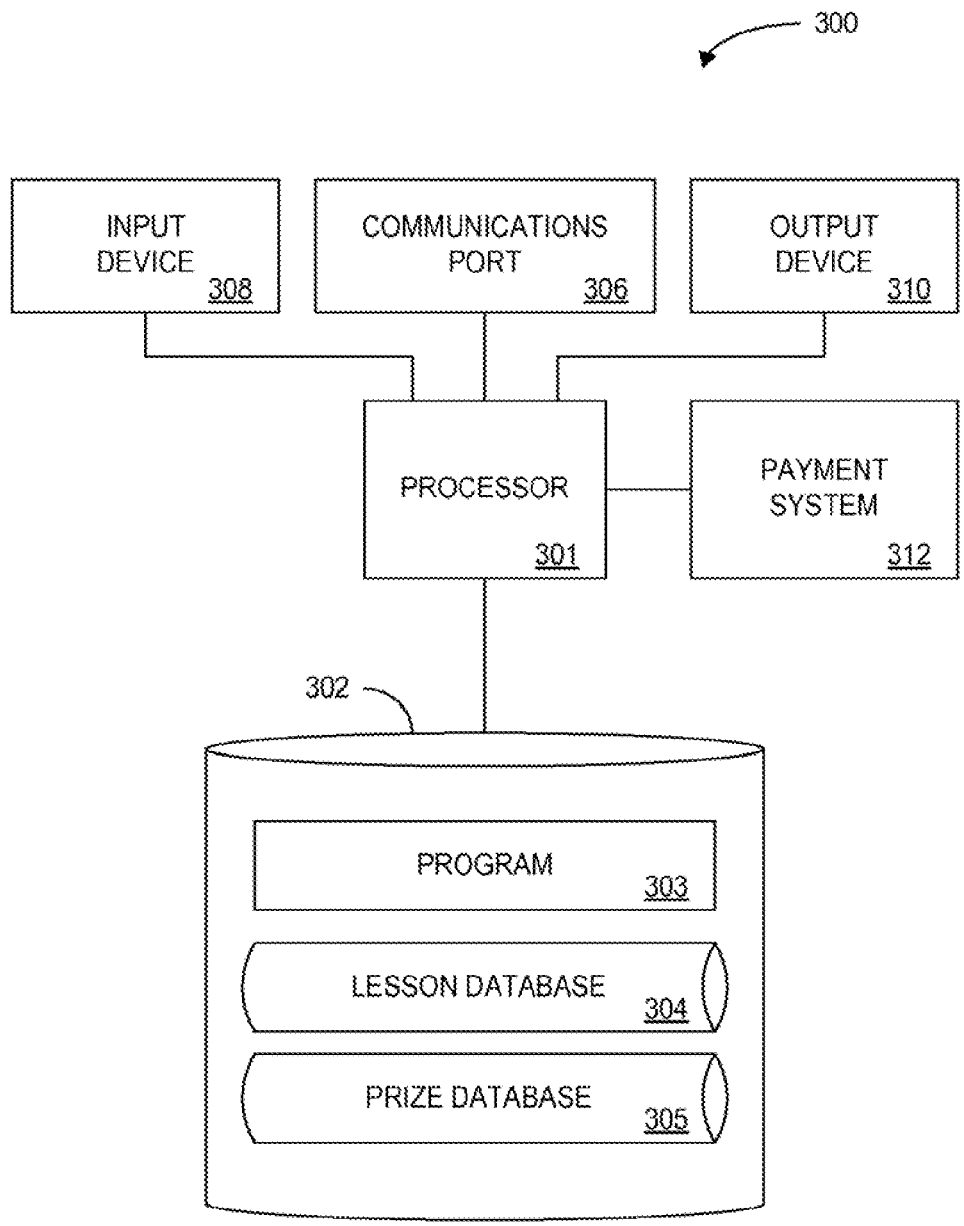
FIG. 3 is a block diagram of an exemplary game machine of one or more embodiments of the present invention.

FIG. 3 illustrates an exemplary embodiment of the game machines 108, 110, 112 (FIG. 1). Well-known examples of game machines include, without limitation, slot machines, video poker machines, video blackjack machines, video keno machines, video lottery terminals, video bingo machines, pachinko machines, table-top games (e.g., as may typically be located in a bar or other commercial establishment), a personal computer (e.g., to communicate with a Web site that provides gambling services), a telephone (e.g., to communicate with an automated sports book that provides gambling services), a portable handheld device (e.g., a PDA, a GAMEBOY™ manufactured by NINTENDO™), hardware located at a game table (e.g., suitable for entering a player identifier and/or an average wager size), video roulette machines, a skill crane, a video game, an arcade terminal, and reeled slot machines (e.g., mechanical and/or video reel slot machines).

The exemplary game machine 300 of FIG. 3 may be implemented as a system controller, a dedicated hardware circuit, a dedicated terminal (e.g., having one or more functions directed remotely by a controller), an appropriately programmed general-purpose computer, or any other appropriate device including, without limitation, electronic, mechanical or electro-mechanical devices. The game machine 300 is operative to provide for various embodiments of the present invention. For example, some or all of the processes for providing a tour of a secondary game may be carried out by the game machine 300.

The game machine 300 comprises a processor 301, such as one or more INTEL® PENTIUM® microprocessors. The processor 301 is in communication with a data storage device 302. The data storage device 302 comprises, for example, magnetic memory, optical memory, semiconductor memory, or any combination thereof. The data storage device 302 may also include, for example, one or more additional processors, communication ports, Random Access Memory (RAM), Read-Only Memory (ROM), a compact disc and/or a hard disk. The processor 301 and the storage device 302 may each be, for example: (i) located entirely within a single computer or other computing device; or (ii) connected to each other by a remote communication medium including, without limitation, a serial port cable, a LAN, a telephone line, a fiber optic connection, a network connection, or a radio frequency transceiver. In some embodiments, the game machine 300 may comprise one or more computing devices that are connected to a remote server computer operative for maintaining databases.

The data storage device 302 preferably stores a program 303 (e.g., computer program code and/or a computer program product) for controlling the processor 301. The processor 301 may perform instructions of the program 303, and thereby operate in accordance with one or more embodiments of the present invention, and particularly in accordance with one or more of the methods described in detail herein. For example, the controller 200 may transmit a control signal to game machine 300 to execute various instructions of the program 303. Data, including program 303, may be stored in the data storage device in a compressed, uncompiled and/or encrypted format, as well as in a variety of other forms known in the art. The data storage device 302 also preferably stores program elements that may be necessary, including, without limitation, an operating system, a database management system and "device drivers" for allowing the processor 301 to interface with one or more peripheral devices. Appropriate program elements are well known to those skilled in the art, and need not be described in detail herein.

According to some embodiments of the present invention, information, including program 303, may be read into a main memory from another computer-readable medium, such as into RAM from a hard drive or ROM. Execution of sequences of the instructions in stored program 303 may cause the processor 301 to perform any of various process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware, firmware, and/or software.

The storage device 302 also stores (i) a lesson database 304, and (ii) a prize database 305. The databases are described in detail below and depicted with exemplary entries in the accompanying figures.

The processor 301 may include or be coupled to one or more clocks or timers (not pictured), and/or one or more communication ports 306 through which the processor 301 may communicate with other devices, such as the controller 200, a peripheral device (e.g., an input device, an output device) and/or another game machine. The communication port 306 may be, without limitation, a serial port, modem, wireless transmitter/receiver, or the like.

The processor 301 may also be in communication with at least one input device 308, which may be used to receive input from a player or other user of the game machine. Input device 308 may comprise any number or combination of a variety of well-known devices, including, without limitation: a button, a touch screen, a handle (e.g., a slot machine handle), a keypad, a pointer device (e.g., a mouse, a trackball), a microphone, a keyboard, a video camera, a magnetic stripe reader (e.g., for performing functions related to player tracking cards, such as accepting and reading player tracking cards and communicating information read from such cards to the processor 301), a biometric input device (e.g., a fingerprint or retinal scanner), a radio antenna (e.g., for receiving inputs from a handheld device), a voice recognition module, and a coin and/or bill acceptor.

Input device 308 may comprise, for example, a ticket reader which is capable of reading, for example, receipts, coupons, vouchers, cashless gaming receipts and/or tickets, and particularly indicia registered on any such substrates. The ticket reader may use optical sensing of printed indicia and optical character recognition, for example, to read indicia from a ticket inserted in the ticket reader.

Input device 308 may comprise, for example, a credit card reader. Such devices are known in the art, and generally allow a card such as a credit card or debit card to be inserted therewithin. The card may include a magnetic stripe or other form of data storage, which the credit card reader is capable of sensing and interpreting. Typically, the credit card reader allows a credit card transaction to be processed by communication with a credit card clearinghouse in a manner known in the art.

The processor 301 may also be in communication with at least one output device 310, which may be used to output information to a player or other user of the game machine. Output device 308 may comprise any number or combination of a variety of well-known devices, including, without limitation: a display device, a light-emitting diode (LED), an audio speaker, an electric motor, a printer, a coupon or product dispenser, an infra-red port (e.g., for communicating with a second game machine), a Braille computer monitor, a coin and/or bill dispenser, a bell, an LED display (e.g., for displaying a players credit balance).

Output device 310 may include, for example, a printer in communication with processor 301. The printer may be commanded to print onto a substrate, such as paper or other material. Printing may be via ink jet, laser printing or other methodology for registering indicia on a substrate. Alternatively, the substrate may be registered with indicia by deforming the substrate in a variety of ways known in the art, including, without limitation, punching holes in the substrate and raising and/or lowering portions of the substrate relative to other portions. The printer may be used for printing, e.g., receipts, coupons, vouchers, cashless gaming receipts and/or tickets.

Output device 310 may comprise, for example, one or more display devices, operable to display messages, animation, images, text, and/or graphics in a manner known in the art. Typical display devices include, without limitation, liquid crystal displays, plasma displays and video display monitors.

The processor 301 may also be in communication with a payment system 312 for accepting payment from a player (e.g., a wager) and providing payment to a player (e.g., a prize). It will be readily understood that payment is not limited to coins or cash, but may include other types of consideration, such as a product, a service, a credit, or an alternate currency. The payment system 312 may be operable to perform one or more operations, including, without limitation, one or more of: (i) receiving hard currency (i.e., coins or bills), for example, via a coin or bill acceptor; (ii) receiving an alternate currency (e.g., a paper cashless gaming voucher, a coupon, a casino token); (iii) receiving a payment identifier (e.g., a credit card number, a debit card number, a player tracking card number) and/or debiting a corresponding account; and (iv) determining that a player has performed a value-added activity (e.g., answering a plurality of survey questions); (v) dispensing hard currency; (vi) dispensing an alternate currency; (vii) crediting a player account (e.g., a bank account or other financial account), such as by identifying an account using a payment identifier (e.g., a credit card number, a debit card number, a player tracking card number); and (viii) providing a product or service to the player (e.g., a jackpot prize may be a new car). One or more of the functions of the payment system 312 may be facilitated by the input device 308 and/or the output device 310.

According to some embodiments of the present invention, the game machine 300 is operable (e.g., in accordance with instructions of program 303) to provide one or more games based on chance and/or skill, in a manner well known in the art. Some examples of games of chance include, without limitation, slot machines, video poker, blackjack, keno, bingo, video poker, and pachinko. Some examples of games of skill include, without limitation, video games, skill cranes, and skee-ball. Game machines providing games of skill may be more appealing to certain players, or may be permitted in areas where it is illegal to gamble on games of chance.

The game machine 300 is preferably operable to provide a primary game or mode (e.g., a basic game, a qualifying round), as well as a secondary game or mode (e.g., a bonus round). For example, the data storage device 302 may store instructions in computer program code and/or a computer program product (e.g., in program 303) for providing a primary game with a bonus round, in a manner known in the art. Alternatively, as is well known in the art, the game machine 300 may be a client or dedicated terminal responsive to signals transmitted by the controller 200 and directing the game machine 300 to provide the primary game and/or the bonus game.

In some but not all primary games, a player must receive a winning outcome (or outcomes) in order to gain entry to a secondary game. In some games, the qualifying outcome need not be a winning outcome (e.g., the outcome need not be associated with a prize). In some games, a player may qualify for a bonus round based on various other factors, such as achieving a predetermined level of activity (e.g., an amount wagered, a rate of play).

The following are examples of secondary games that may be referred to herein for illustrative purposes in describing various embodiments of the present invention:

Golden Egg—A game in which a player attempts to hatch as many chickens as possible (e.g., by clicking on eggs to crack them open). The bonus round ends when the player cracks open an egg that has an alligator inside (in which case the player wins a prize based on the number of chickens hatched to that point), or when the player cracks open an egg and finds a "Golden Egg" (in which case the player wins a large jackpot).

Wheel of Riches—A game in which a player spins a wheel to determine what prize(s) he wins. The player may spin the wheel multiple times—each time the player spins the wheel, an outcome is determined. If this outcome corresponds to a prize, then the prize is added to the player's stash of prizes (e.g., as may be displayed on a video screen). If the outcome is a "Thief", however, then the player's entire stash of prizes is "stolen" (i.e., the player becomes ineligible for the prizes) and the bonus round ends. The player is able to choose how many times he spins the wheel; he can stop at any time and keep whatever prizes are in his stash. By spinning the wheel multiple times, a player may build up a large stash of prizes. Of course, each time he spins the wheel, he runs the risk of getting a "Thief" outcome and loses any accumulated prizes.

Rascally Rabbit—A game in which a player attempts to guess which hole a rabbit game character is hiding in. For example, there may be ten holes represented on a video screen. The player can click on one of the holes to look for the "Rascally Rabbit" in that hole. If the "Rascally Rabbit" is in that hole, then the player wins a jackpot.

Free bonus play—A player may win a free spin on a slot machine, or a free play on a video poker machine, as a bonus round.

The various exemplary secondary games, bonus rounds, primary games, and qualifying rounds discussed herein are for illustration only. Various other types of games that may be available on a game machine will be readily apparent to those of skill in the art.

Databases

Player Database

FIG. 4 is a tabular representation 400 of the player database 208 of FIG. 2. The tabular representation 400 of the player database 208 includes a number of example records or entries, each indicating a player. Those skilled in the art will understand that the player database 208 may include any number of entries, and as discussed herein, may be stored in communication with a controller and/or a game machine.

The tabular representation 400 also defines fields for each of the example entries or records. The fields specify: (i) a player identifier 402 that uniquely identifies a player; (ii) a player name 404; (iii) an indication of whether the player has taken a tour 406, such as a tour of a "Golden Egg" bonus round; (iv) a most recent tour 408 that indicates a time that the player last participated in a tour of the "Wheel of Riches" bonus round; and (v) a number of tours 410 that indicates how many times the player has participated in a tour of the "Rascally Rabbit" bonus round.

The tabular representation 400 provides example data to illustrate the information stored in this database embodiment. One sample entry describes a player "JIM BLUE" who is uniquely identified by "PLAY-028345525-03". The sample entry for "JIM BLUE" indicates that the player last took a tour of the "Wheel of Riches" bonus round at "Mar. 15, 2002 8:12 PM", has taken three tours of the "Rascally Rabbit" bonus round, and has not taken a tour of the "Golden Egg" bonus round.

Not all of the fields depicted in FIG. 4 are required, and various substitutions, deletions and other changes to the tabular representation will be readily apparent to those of ordinary skill in the art. For example, the player's name may not be needed in many embodiments. The depicted fields, for example the names of the exemplary bonus rounds and the types of statistics depicted (e.g., number of tours), are for illustration only. More or fewer types of information about fewer or more types of secondary games may be included in some embodiments. Various other forms of information related to tours of a secondary game are described herein, and still others will be readily apparent to those of skill in the art.

Although player identifier 402 is described above as uniquely identifying a player, such an identifier need not be unique. According to some alternative embodiments, for example, a player identifier may be a group identifier that identifies a group of which the player is a member. For example, the player may be (i) a member of a household that has three other members, (ii) one of three people staying in a hotel room, or (iii) a member of a tour group visiting a casino.

As will be readily understood, a variety of different types of player identifiers are possible. According to one embodiment, a player identifier may be any information sufficient to identify a player. For example, a player identifier may include an indication of one or more of the following: (i) a player's name (e.g., first name, last name); (ii) a player's home address; (iii) a telephone number of the player; (iv) a player tracking card number; (v) a player's hotel room number (e.g., if a player is staying at a hotel that is associated with a casino); (vi) a player's email or other telecommunication address; (vii) a payment identifier or account identifier that identifies a financial account of a player (e.g., a credit card number, a debit card number, a financial account number).

According to one or more embodiments of the present invention, a game machine and/or a controller may receive an indication of a player identifier. Based on the player identifier, a game machine and/or a controller may be able to access information associated with the player (e.g., the player's name, gaming history of the player, etc.) based on the player identifier (e.g., by accessing a corresponding entry in player database 208). Examples of how an indication of a player identifier may be received include, without limitation: (i) a player inserts his player tracking card into a game machine; (ii) a player uses a numeric keypad to type in his home telephone number; (iii) a player uses a touch screen to type in his username and a password; (iv) a player uses a biometric input device to identify himself (e.g., using a fingerprint scanner); (v) a player indicates a player identifier using an input device on a game machine; (vi) a game machine transmits a player identifier to a controller (or vice versa); and (vii) a game machine transmits an indication of a player identifier to another game machine.

Lesson Database

FIG. 5 is a tabular representation 500 of the lesson database 304 of FIG. 3. The tabular representation 500 of the lesson database 304 includes a number of example records or entries, each indicating a lesson that may be provided to a player, for example, during a tour or other promotional demonstration of the exemplary "Golden Egg" bonus round. Those skilled in the art will understand that the lesson database 304 may include any number of entries, and as discussed herein, may be stored in communication with a controller and/or a game machine.

The tabular representation 500 also defines fields for each of the example entries or records. The fields specify: (i) a lesson identifier 502 that uniquely identifies a lesson; (ii) a trigger 504 that indicates a circumstance, condition, or requirement for communicating the lesson to a player; (iii) a text of lesson 506 that includes an indication of a message that may be displayed or otherwise communicated to a player during a tour.

The tabular representation 500 provides example data to illustrate the information stored in this database embodiment. One sample entry describes a lesson uniquely identified as "LESSON-123890-01" that is triggered for communication to a player at "START OF FIRST BONUS ROUND ON THE TOUR". According to this sample entry, a player at a game machine who is starting the first bonus round of the tour will receive a message including the text: "THE GOAL OF THIS GAME IS TO HATCH BABY CHICKENS AND FIND THE GOLDEN EGG. YOU WANT TO AVOID CRACKING OPEN EGGS WITH ALLIGATORS IN THEM."

Another sample entry describes a lesson uniquely identified as "LESSON-123890-05" that will be communicated to a player if the "PLAYER DOES NOTHING FOR MORE THAN 5 SECONDS". Thus, according to this sample entry, if a game machine 108 or a controller 102 determines that the player is idle (e.g., at a game machine) for more than five seconds, the player will receive a message (e.g., a visual and/or audio message) including the text: "TO CRACK OPEN AN EGG, USE YOUR FINGER TO TOUCH THE EGG ON THE VIDEO SCREEN."

Not all of the fields depicted in FIG. 5 are required, and various substitutions, deletions and other changes to the tabular representation will be readily apparent to those of ordinary skill in the art. The depicted fields, for example the types of triggers, are for illustration only. Various other types of conditions and circumstances for providing various types of messages related to play of a secondary game are described herein, and still others will be readily apparent to those of skill in the art.

Prize Database

Figure 6:
FIG. 6 is a tabular representation of an exemplary prize database of one or more embodiments of the present invention.

FIG. 6 is a tabular representation 600 of the prize database 305 of FIG. 3. The tabular representation 600 of the prize database 305 includes a number of example records or entries, each indicating an outcome that may occur during play of the exemplary "Golden Egg" bonus game. Those skilled in the art will understand that the prize database 305 may include any number of entries, and as discussed herein, may be stored in communication with a controller and/or a game machine.

The tabular representation 600 also defines fields for each of the example entries or records. The fields specify: (i) an outcome 602 that indicates an outcome that may be determined during play of a secondary game (e.g., based on a player selection of a game element); (ii) a probability of outcome 604 that indicates a probability that a player may receive the corresponding outcome; (iii) a prize 606 that indicates a payout or other prize a player will receive for the corresponding outcome; (iv) a probability of outcome during tour 608 that indicates a probability that a player may receive the corresponding outcome during a tour of the secondary game; and (v) a prize during tour 610 that indicates a payout or other prize a player will receive for the corresponding outcome if the outcome is achieved while the player is taking a tour of the secondary game.

The tabular representation 600 provides example data to illustrate the information stored in this database embodiment. One sample entry indicates that a player has a "75%" probability of a "PLAYER HATCHES A BABY CHICKEN" outcome during normal play of the exemplary "Golden Egg" bonus game for a prize of "10 COINS". The player has a greater probability ("89%") of achieving the same outcome during a tour, but the prize during the tour is less—"1 COIN". Another sample entry indicates that a player has a lower probability of achieving the outcome of "PLAYER FINDS GOLDEN EGG" during a tour ("1%") than during normal play ("5%"), but the prize provided for the outcome during a tour ("500 COINS") is greater than that provided during normal play of the bonus game ("300 COINS").

Not all of the fields depicted in FIG. 6 are required, and various substitutions, deletions and other changes to the tabular representation will be readily apparent to those of ordinary skill in the art. For example, information corresponding to prizes and probabilities during a tour of a secondary game may be stored in a different database than information corresponding to normal play of the secondary game. The depicted fields, for example the types of prizes, are for illustration only. In some embodiments, as discussed herein, prizes may be other than coins or currency. Prizes may comprise, for example, without limitation: (i) money (e.g., coins, bills, or credits on a game machine); (ii) an alternate currency (e.g., casino chips, tokens, points, frequent flyer miles, minutes of long distance phone time); (iii) non-redeemable credits (e.g., the player may use the non-redeemable credits to play games in regular mode after the tour is over); (iv) products (e.g., a toaster oven); (v) services (e.g., a free game, access to premium gaming services); and (vi) other forms of consideration. Various other types of outcomes and prizes are described herein, and still others will be readily apparent to those of skill in the art.

Processes

According to one or more embodiments of the present invention, a player may be allowed to participate in a tour, tutorial, or other promotional, educational, introductory and/or informational demonstration of one or more secondary games on a game machine.

in accordance with one or more embodiments of the present invention, a tour or other introduction to a secondary game provides an alternate method of entry into a bonus round (or into a modified version of a bonus round). For example, a tour allows a player to experience bonus round play without first obtaining a qualifying outcome (e.g., in a qualifying round). This may be helpful to a novice player, as well as other types of players, because it allows a player to gain experience in playing the bonus round, and may also help the player to understand and appreciate the bonus round. Without the ability to participate in a bonus round experience, a player may not be able to appreciate how much money may be won in the bonus round, or how fun the bonus round can be.

According to one or more embodiments of the present invention, a player taking a tour may be able to play a bonus round in accordance with the normal rules of the bonus round. According to some alternative embodiments, one or more aspects of a bonus round may be modified for use in a tour. There are various reasons why an operator of a game machine may choose to modify play of a bonus round during a tour. For example, according to some embodiments of the present invention, an operator, owner, or manufacturer of a game machine may use a tour as a way of enticing players to play the game machine. Various ways to motivate players to take a tour include, without limitation, providing a benefit in exchange for taking the tour, providing prizes in the tour that are larger than normal, or enabling more frequent payouts in tour mode. According to some embodiments, one or more entities (e.g., an operator, a merchant, a game manufacturer) may sponsor the difference in payout values; this embodiment is described in further detail herein. Of course, the ability to receive instruction while playing a secondary game, or merely the opportunity to play the secondary game (e.g., particularly if it is difficult otherwise to gain access to a bonus round) may be motivation enough for some players.

In some embodiments, a bonus round played normally may pay players large prize values on average (i.e., it may have a high expected value). During regular game play, these large prizes may typically be offset by having the bonus round occur infrequently and/or by enabling a qualifying round that pays out smaller prizes on average (i.e., the qualifying round may have a lower expected value). Accordingly, it may be considered too expensive to a game machine operator to allow players to tour a bonus round that has such a high expected value of prizes. Therefore, an operator of a game machine may elect to modify play of the bonus round in a tour mode in order to decrease the expected value, thereby decreasing the cost of providing a tour to a player. As an alternative to modifying play of the bonus round, or in addition to modifying play, an operator may charge a player a fee for taking a tour of a bonus round.

A bonus round may be modified for a tour in a variety of ways, including, without limitation:

- Increasing or decreasing the value of one or more prizes available in the bonus round. For example, the "Golden Egg" bonus round described herein may be modified so that the bonus for finding the "Golden Egg" is 500 coins during the tour, instead of the normal 300 coins.
- Increasing or decreasing the odds of achieving a winning outcome (or any other type of outcome) in the bonus round. For example, the "Rascally Rabbit" bonus round described herein may be modified by increasing or decreasing the number of holes from which the player must choose, thereby modifying the probability that the player will correctly select the hole in which the rabbit is hiding. In another example, the bonus round may be modified to increase or decrease the number of hidden rabbits.
- Modifying one or more rules of the bonus round. For example, the rules of a bonus round may be simplified to make one or more aspects of the bonus round easier for a player to understand during a tour. For example, during a tour of the "Wheel of Riches" game described herein, a rule may be modified so that the player is allowed to spin again if a thief steals all of his stash.
- Increasing or decreasing the expected value of the bonus round. As will be readily understood by those skilled in the art, an expected value of a game may be determined by multiplying the odds of each possible outcome by the respective prize value provided for that outcome, and then summing the resulting products.
- Adding or removing outcomes or prizes. For example, in normal play of a "Golden Egg" bonus round, a player may receive a prize if he hatches a chicken. However, in a tour of the "Golden Egg" bonus round, a player may not receive a prize if he hatches a chicken. In a second example, a player taking a tour of a bonus round may receive a prize if he hatches three chickens in a row; this event may not award any special prize in a normal bonus round.

Figure 7:
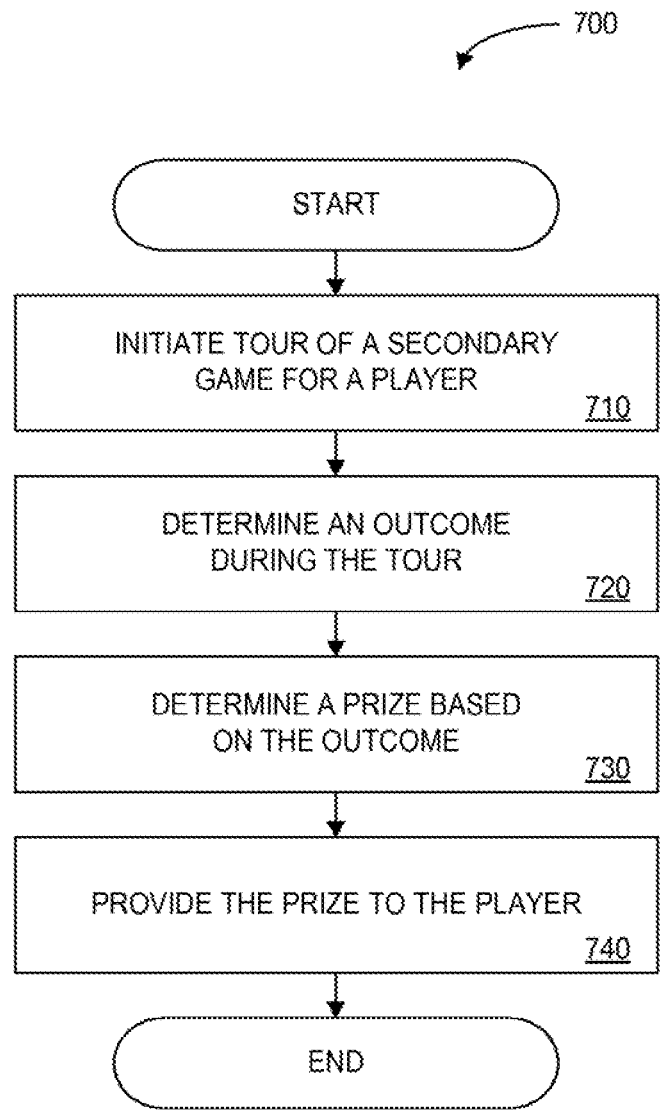
FIG. 7 is a flow chart representing an exemplary process of one or more embodiments of the present invention.

Referring to FIG. 7, a flow chart 700 represents an embodiment of the present invention that may be performed by the controller 102 and/or the game machine 108. The particular arrangement of elements in the flow chart of FIG. 7, as well as the other flow charts discussed herein, is not meant to imply a fixed order to the steps; the steps can be practiced in any order, sequence, and/or timing that is practicable.

In general terms and referring to FIG. 7, the method steps may be summarized as follows. In step 710, a tour of at least one secondary game is initiated for a player. In step 720, an outcome is determined during the tour. In step 730, a prize is determined based on the outcome. In step 740, the prize is provided to the player.

Each of these steps is discussed herein in greater detail. Note that not all of these steps are required to perform various methods of the present invention and that additional and/or alternative steps are also discussed herein. Also note that the above general steps of flow chart 700 and of other various exemplary methods described herein, represent features of only some of the embodiments of the present invention and that they may be combined and/or subdivided in any number of different ways so that the method includes more or less actual steps. For example, in some embodiments many additional steps may be added to update and maintain one or more of the databases described herein, but as indicated, it is not necessary to use the above-described databases in all embodiments of the invention. In other words, the methods of the present invention may contain any number of steps that are practicable to implement the processes described herein. The methods of the present invention are now discussed in detail.

In step 710, a tour of at least one secondary game is initiated for a player by a game machine and/or a controller. For example, as described variously herein, a tour may be initiated by the controller 200 in a variety of ways, including, without limitation: (i) in response to a trigger, (ii) based on an indication from a player, (iii) after receiving a response to a prompt, (iv) automatically, (v) after receiving an indication of a request by a player for a tour, (vi) after receiving an indication of an entry fee or other payment by or on behalf of a player, and/or (vii) after determining whether the player is eligible to take a tour.

According to one or more embodiments of the present invention, initiating a tour for a player may comprise determining whether the player is eligible to take a tour. For example, a player may be refused access to a tour if the player has already taken the tour more than a predetermined maximum number of times. Various ways for determining whether a player is eligible are discussed further herein and with respect to FIG. 8. According to one or more embodiments of the present invention, initiating a tour may comprise receiving an indication of payment by (or on behalf of) a player. For example, initiating a tour may comprise receiving an entry fee for the bonus round from a player. Other embodiments related to consideration provided in exchange for a tour are discussed further herein and with respect to FIG. 9.

According to one or more embodiments of the present invention, a tour may be initiated based on (or in response to) an indication or other trigger. Alternatively, or in addition, a player may be prompted to take a tour in response to a trigger. As described variously herein, a trigger corresponds to a stimulus, interrupt, condition, signal, criterion, exception, or other event that may occur. Some examples of triggers for initiating a tour and/or prompting a player to take a tour include, without limitation:

- Receiving an indication that a player is or may be present at a game machine. Some examples of such indications include, without limitation: (i) a player presses a button on a game machine; (ii) a player touches a touch screen on a game machine; (iii) a player pulls a lever on a game machine; (iv) a player activates a weight sensor in front of a game machine; (v) a player uses a portable device (e.g., a handheld device, a radio-frequency identification tag) to communicate with a game machine; (vi) a player uses an input device on a game machine (e.g., a credit card reader, a biometric input reader); and (vii) a player provides a player identifier.
- A player loses at least a predetermined number of rounds of a primary game. Fore example, a player loses ten qualifying rounds in a row (e.g., the player is unable to access the bonus round) when playing a bonus round game machine.
- A player loses at least a predetermined amount. For example, a player loses $10 (e.g., without winning entrance into a bonus round).
- A player loses at least a predetermined amount within a period of time. For example, a player loses $10 in less than five minutes.
- A player's credit balance on a game machine falls below a threshold value.
- Additional types of triggers, including game-related events, indications provided by a player, and time-related conditions, are described further herein; others will be readily apparent to those skilled in the art in light of the present disclosure. According to some embodiments of the present invention, a tour of a bonus round may be initiated automatically based on a trigger.

In one example of initiating a tour, the controller 200 determines (e.g., based on information received from the game machine 300) that a player playing a primary game on the game machine 300 has lost $10 without gaining access to the associated bonus round. In response to the determination of this trigger condition, the controller 200 transmits a signal to the game machine 300, directing the game machine 300 to initiate a tour and/or to prompt the player to take a tour.

As discussed herein, according to one or more embodiments, a prompt may be displayed (or otherwise communicated) to a player in response to a trigger. Prompting a player to take a tour may help to teach a player more about a bonus round game machine, and may prevent the player from becoming discouraged (e.g., if the player is losing often during a qualifying round on the game machine). For example, a player may be able to view a displayed message or graphic (e.g., on a display device of the game machine) or listen to an audio message (e.g., via a speaker), that includes an offer or advertisement for a tour. A prompt may indicate a benefit provided in exchange for taking the tour, if any, may provide information about a cost of the tour, if any, and may provide the player with a choice of one or more tours of one or more different bonus rounds.

According to some embodiments, the tour may be initiated based on the player's response to the prompt. For example, the player may touch a "TAKE TOUR" button on a touch screen of the game machine 300, or otherwise indicate a request by the player to take the tour. In response, the game machine 300 and/or the controller 200 may initiate a tour of a secondary game at the game machine 300.

In some embodiments of the present invention, a tour may be initiated after receiving an indication of a request by a player for a tour. The indication of a request may comprise an indication from a player (e.g., the player pushes a "TAKE TOUR" button on the game machine 300), a response by a player to an offer for a tour (or other prompt), and/or an indication of payment by the player. Other types of indications that may comprise an indication of a request by a player for a tour are discussed herein, and others may be readily apparent to those skilled in the art.

In step 720, an outcome is determined during the tour of the at least one secondary game. According to one or more embodiments of the present invention, the controller 200 may determine one or more outcomes for a secondary game that is part of a tour (e.g., of a bonus round). Some examples of outcomes for a secondary game include, without limitation:

A player wins a prize. For example, a player may select a game element that corresponds to a prize (e.g., the player selects an egg that hatches a chicken in a "Golden Egg" bonus game).

A player does not win a prize. For example, a player may select a game element that does not correspond to a prize (e.g., the player picks the wrong hole in a "Rascally Rabbit" bonus game).

The secondary game or bonus round ends. For example, a player selects an egg in that hatches an alligator in "Golden Egg," ending the bonus round.

One or more reels of a slot machine stop at a position. For example, a player may get a free spin on a five-reel slot machine as a bonus game. The outcome of this spin may be "LEMON-BAR-BAR-LEMON-CHERRY," for example.

One or more cards are dealt. For example, a player may get a free round of video poker as a bonus round. The outcome of an initial or subsequent deal in the round may be "ACE (HEARTS)-KING(HEARTS)-QUEEN(HEARTS)-JACK(DIAMONDS)-FIVE(DIAMONDS)."

One or more numbers are determined. For example, a number may be generated by a random number generator. The number may correspond, for example, to an entry in a prize table (e.g., a payout database). In another example, a determined number corresponds to a number of spaces to advance on a path of a represented board game.

Other types of outcomes that may be achieved in a secondary game or a bonus round are discussed herein; others may be readily understood by those having ordinary skill in the art.

As will be understood by those skilled in the art, an outcome for a bonus round may be based on a variety of factors, including At least one indication, selection, or decision by a player. For example, a player who is playing the "Golden Egg" bonus round may select which represented egg he would like to crack open (e.g., by touching a location corresponding to the representation of the egg on a touch screen device). In another example, a player may elect to "hit" in a hand of blackjack in order to receive an additional card. The outcome of the hand may be based on at least in part on this decision.

At least one random number (or pseudo-random number). For example, the location of the rabbit in the "Rascally Rabbit" bonus round may be determined by a random number generator. According to one embodiment, a game machine may include a random number generator that generates pseudo-random numbers. The number itself may be described as an outcome and or may be used to determine an outcome.

Other factors for determining an outcome are discussed herein; still other factors may be readily understood by those having ordinary skill in the art.

In step 730, a prize is determined based on the outcome determined during the tour. For example, based on the determined outcome, the game machine 300 or the controller 200 may determine a prize to provide to the player. According to some embodiments, as discussed herein, a prize that is provided during a tour of a bonus round may be different from a prize that is provided for the same outcome during an actual bonus round. For example, as depicted in tabular representation 600 of prize database 305, if a player wins access to a bonus round in "Golden Egg", he may receive ten coins for each baby chicken that he hatches. However, a player may only receive one coin for each baby chicken that he hatches during a tour of the "Golden Egg" bonus round. Thus, the player wins a reduced prize during a tour. These prize values may be different for a variety of reasons, as discussed herein.

According to one or more embodiments of the present invention, the game machine 300 and/or the controller 200 may optionally communicate to the player an indication of a prize that could have been received by the player during normal play of a secondary game, based on the outcome. Other embodiments related to communicating such information to a player during a tour are discussed further herein and with respect to FIG. 10.

According to one or more embodiments, the game machine 300 may use a prize database (e.g., prize database 305) to determine a prize to provide to a player during a tour of a bonus round. FIG. 6 depicts a tabular representation 600 a prize database 305 for a "Golden Egg" bonus round. Note that both the odds of each outcome and the prize for each outcome may be different during normal bonus round play relative to during a tour of the bonus round.

In step 740, the determined prize is provided to the player. For example, in some embodiments the prize is determined by the game machine 300 (e.g., by accessing the prize database 305) and provided to the player. According to some embodiments of the present invention, the controller 200 may transmit a signal to the game machine 300 or to a peripheral device (e.g., a printer) to direct the device to dispense a prize to the player. Some examples of providing a prize to a player at a gaming machine 300 include, without limitation: (i) dispensing at least one coin (e.g., via a coin hopper or other output device at a game machine); and (ii) dispensing a receipt, coupon, voucher, cashless gaming receipt, prize code, or other identifier to a player (e.g., the player may then use this receipt to obtain a prize from an alternate source, such as a casino cage). Various methods of providing a prize to a player are known to those skilled in the art and need not be described in further detail herein.

Optionally, providing a tour of a bonus round may comprise communicating at least one lesson to a player during a tour. Various embodiments related to communicating a lesson to a player are discussed herein and with respect to FIG. 11.

According to some embodiments of the present invention, as discussed herein, a tour of a bonus round may have an expected value to a player that is greater than the cost (if any) to the player. For example, a player may be required to pay $5 to take a tour that lasts for six games. The expected payout of each game may be $1, meaning that the expected payout for the entire tour is $6. Therefore, it is expected that a player will gain $1 by taking the tour. In another example, a player may be allowed to take a tour for free. The expected payout during the tour is $3. Therefore it is expected that the player will gain $3 by taking the tour. Obviously, such embodiments may be appealing to a player, as the odds are in the player's favor that the player will make money by taking this tour one or more times.

If a player can make money by taking a tour, a player may attempt to take multiple tours to make additional money for himself. Accordingly, it may be advantageous for a casino or other operator of a game machine to be able to set one or more eligibility conditions, for example, that prevent a player from taking multiple tours. In one example, a player may be required to provide a player identifier before taking a tour. The controller 200 may then update the player database 212 to indicate that the player identified by the player identifier has taken the tour.

In another example, according to some embodiments, a player may be prompted to indicate his player identifier upon achieving a winning outcome during a tour. Note that a mischievous player may attempt to cheat such a system by initiating several tours, but only providing a payment identifier when he wins a prize on a tour. Therefore, such embodiments may be more desirable if prizes won on a tour are of low value or there is a low variance in prizes won on a tour.

According to some embodiments, a player may enter a player identifier at the start of a tour. For example, a player may be prompted to provide a player identifier before a tour will begin. In this way, the controller 200 may store an indication that the player has taken the tour in a corresponding entry of the player database 208. Such an indication may be used, as discussed herein, for determining whether a player is eligible for a future tour.

Figure 8:
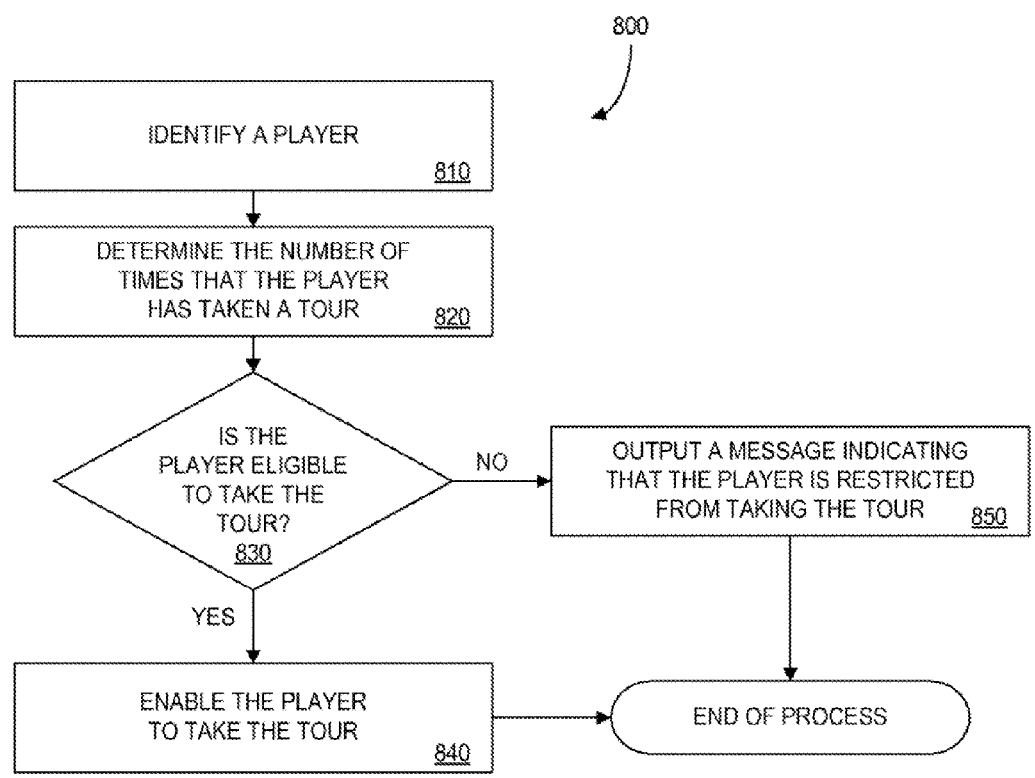
FIG. 8 is a flow chart representing an exemplary process of one or more embodiments of the present invention.

Referring to FIG. 8, a flow chart 800 represents an embodiment of the present invention that may be performed by a controller and/or a game machine, including, without limitation, a slot machine, for determining whether a player is eligible to take a tour on a game machine (e.g., a tour of a bonus round, a tutorial for a primary game). The particular arrangement of elements in the flow chart of FIG. 8, as well as the other flow charts discussed herein, is not meant to imply a fixed order to the steps; the steps can be practiced in any order, sequence, and/or timing that is practicable.

In general terms and referring to FIG. 8, the method steps may be summarized as follows. In step 810, a player is identified. In step 820, a number of times that the player has taken a tour on a game machine is determined. In step 830, it is determined whether the player is eligible to take the tour. If the player is eligible, in step 840 the player is enabled to take the tour. If the player is not eligible, in optional step 850 a message is output indicating that the player is restricted from taking the tour.

In step 810, a player is identified. A game machine 300 and/or a controller 200 may use a provided player identifier to determine and/or store information associated with the player, such as historical information about any tours the player has taken. For example, the gaming machine 300 receives a player identifier from a player at the gaining machine, and transmits the player identifier to the controller 200. Based on the player identifier, the controller 200 may access various information stored, for example, in the player database 208, including information about tours the player has already taken. Various types of player identifiers, as well as means for receiving, and times for requiring them, are discussed herein According to some embodiments of the present invention, a player may be permitted to take a tour only a limited number of times (e.g., no more than a predetermined maximum number of times). For example, the controller 200 may prevent a player from taking a tour more than once, or from taking a tour more than three times. Alternatively, the player may be limited by the number of games he is allowed to play while in tour mode. For example, a player may only be permitted to play only ten games in tour mode (but the player may not have been limited in how many times he entered tour mode until he reached the limit of ten games played).

Accordingly, in step 820 the controller 200, for example, determines the number of times that the player identified in step 810 has taken a tour of the game machine 300. For example, as discussed herein, the controller may access stored data (e.g., the player database 208) to determine the number of times that a player has taken a tour of the "Golden Egg" bonus round.

In step 830, the controller 200 determines whether the player is eligible to take a tour based on, for example, the number of times the player has taken a tour and/or on a period of time since the player last took a tour. With reference to the tabular representation 400 (FIG. 4), the player database 208 may store an indication as to whether a player has taken a tour before, when, and/or how many times.

For example, the player in tabular representation 400 identified as "PLAY-028345525-01" has already taken a tour of the "Golden Egg" slot machine, so he may be prevented from doing so again, in accordance with a condition established, for example, by a casino or operator of a game machine.

In another example, a player may be prevented from taking a tour if he has already taken the tour more than a threshold number of times (e.g., a predetermined maximum number of times). For example, players may only be permitted to take three tours of a "Rascally Rabbit" video poker machine. In this exemplary video poker game, the "Rascally Rabbit" bonus round is initiated when the player is dealt the Ace of spades at the start of each of three consecutive hands. Since player "PLAY-028345525-03" has already taken three tours of the "Rascally Rabbit" video poker machine, he may be prevented from taking any additional tours.

In some embodiments, it may be preferred to determine whether a player is eligible to take a tour based on a number of times that the player has taken a tour within a predetermined time period. For example, the controller 200 may be operable to prevent a player from taking a tour more than once per day. In other embodiments, a player's eligibility to take a tour may be based on a number of times that the player has taken a tour at a particular game machine (or type of game machine). For example, a player may only be permitted to take a tour once per game machine.

According to one or more alternative embodiments, a player's eligibility may be determined based on a period of time since the player took a tour. Accordingly, it may be necessary for the controller 200 to determine an amount of time since the player took a tour, in addition to or in lieu of determining how many times a player has taken a tour. For example, the player database 208 may store an indication of when a player last took a tour. The controller 200 may then restrict a player from taking a tour again if the player has already taken the tour during, for example, the previous week. For instance, with reference to the tabular representation 600 (FIG. 6) of the player database 208, the player identified as "PLAY-028345525-02" took a tour of the "Wheel of Riches" slot machine on Apr. 1, 2002 at 5:20 pm. If "PLAY-028345525-02" attempts to take this tour again on Apr. 3, 2002, then he may be prevented from doing so by the controller.

According to some other alternative embodiments, the controller 200 may determine whether a player is eligible to take a tour of a game machine based on a period of time that the player has played in tour mode. For example, a player may only be permitted to spend fifteen total minutes in tour mode (e.g., per type of tour, per month, per year, per game machine). An indication of how long a player has played in tour mode may be stored, for example, in a corresponding entry in player database 208.

According to still other alternative embodiments, the controller may determine whether a player is eligible to take a tour based on information about any combination of the eligibility conditions discussed herein, and further including, without limitation:

Information about a game machine (e.g., the game machine 300 the player is currently using).

A number of tours provided by the game machine during a predetermined period. A game machine may have a limit on the number of tours that it can give during a set time period. For example, a slot machine may only be permitted to give two tours per hour.

Based on a total prize amount provided during tours by one or more game machines. The controller 200 may set a limit, for example, on the total amount of payouts provided during tours on one or more game machines. For example, all of the "Golden Egg" machines may only be permitted to pay out $500 in prizes from tours on any given day (e.g., individually, in combination). After this limit is reached, for example, a "Golden Egg" machine will no longer pay out prizes on tours (or may pay out reduced or further reduced prizes).

In step 840, if it is determined that the player is eligible to take a tour, then the player is enabled to take a tour. Enabling the player to take a tour may comprise storing an indication that the player is eligible for a tour (e.g., in a player database), transmitting a signal to a game machine and/or a controller indicating the player is eligible for a tour, dispensing a voucher redeemable for a tour, and/or initiating a tour for the player on a game machine (e.g., by a controller 200 transmitting a signal to the game machine 300 to begin tour mode).

If the player is not eligible for a tour, in optional step 850, a message is output indicating that the player is restricted from taking the tour. Outputting the message may comprise storing an indication that the player is not eligible for a tour (e.g., in a player database), transmitting a signal to a game machine and/or a controller indicating the player is not eligible for a tour, communicating a visual and/or audio message to the player (e.g., on a display device of the game machine 300) that informs the player he is not eligible to take a tour, and/or initiating a tour for the player on a game machine (e.g., by a controller 200 transmitting a signal to the game machine 300 to begin tour mode).

In some embodiments, a message may be transmitted to the player indicating that the player is not eligible for a tour and/or has been prevented from taking the tour. This message may be determined by the controller 200 and/or a game machine 300, and output through an output device (e.g., an audio speaker) on the game machine 300. Exemplary messages may include, without limitation:

"Sorry, you're only allowed to take the "Golden Egg" tour once."

"Sorry, you're only allowed to take the "Wheel of Riches" tour once per week and you already took the "Wheel of Riches" tour on Apr. 1, 2002 at 5:20 pm. Please come back anytime after Apr. 8, 2002 at 5:20 pm."

According to some embodiments, as discussed herein, a player may pay a fee or provide other consideration to take a tour or to otherwise gain entry to at least one secondary game or bonus round. In exchange for consideration provided by a player, a tour including play of at least one secondary game may be provided to the player. An exemplary process for providing a player with entry to a bonus round in exchange for a fee is described further herein with respect to FIG. 9. In some embodiments, a tour may be initiated in response to receiving an indication of a payment (e.g., determining an amount of inserted currency at a game machine, receiving a payment identifier, receiving an indication of acceptance by the player of a future commitment or other obligation). Of course, in some embodiments of the present invention, a tour may be provided to a player for free.

Examples of consideration that may be provided by a player include, without limitation, money, an alternate currency (e.g., casino chips, game tokens), a player's performance of a value-added activity (e.g., answering a plurality of survey questions), other forms of consideration (e.g., products, services), and any combination thereof.

A variety of different pricing schemes for tours are possible, as may be understood by those skilled in the art. Some examples of pricing schemes include, without limitation:

A player may pay a fee for each secondary game initiated on a tour. For example, a player may pay $0.50 per secondary game on a tour. A player may be limited to a maximum number of games (e.g., ten games). Also, note that a tour may have a limited time duration.

A player may pay a package fee or a flat fee for a plurality of bonus round games played on a tour. For example, a player may pay $5 to take a tour that includes six bonus round games. In some embodiments, a player may enter into a contract for a plurality of secondary games on a tour. Methods and apparatus appropriate for use in accordance with the present invention for providing multiple plays of a secondary game on a game machine for a flat rate price are disclosed in commonly-owned U.S. patent application Ser. No. 10/001,089, entitled "GAME MACHINE FOR A FLAT RATE PLAY SES- SION AND METHOD OF OPERATING SAME", filed Nov. 2, 2001, the content of which is hereby incorporated by reference herein in its entirety.

A player may pay a package fee or a flat fee for play that includes at least one play of a secondary game, and at least one regular play of a primary game (e.g., a series of handle pulls). For example, a player may pay $4 to play five secondary games and five reel spins. In another example, a player may pay $0.75 for two handle pulls of a slot machine game and a tour of the associated bonus round (including at least one play in the bonus round). Thus, a player may be guaranteed to experience some aspect of bonus round play (whether modified or not) in combination with regular play. It will be noted that in some embodiments any of the regular plays purchased by the player also has the potential to qualify the player for the bonus round.

A player may pay for a period of time for a tour. For example, a player may pay $4 for a ten minute tour of a bonus round on a game machine.

A player may pay for a tour per unit of time. For example, a player may be charged $0.25 per minute while touring a bonus round on a game machine.

It will also be understood that some bonus rounds may have multiple screens. For example, a player starts at a first screen and moves on to a second screen if the first screen is successfully completed. Accordingly, in some embodiments of the present invention, a player may pay a fee for each secondary game screen played on a tour.

Alternatively, a plurality of different scenarios may be available in a bonus round, one of which is selected (e.g., at random) when the player qualifies for the bonus round. For example, a bonus round with a carnival theme may have a "Pop the Balloon" scenario, in which the player selects one of three game characters to win a race to pop a balloon, and a "Strength Test" scenario, in which the player selects one of three game characters to win a represented "test of strength." Once a player qualifies for the bonus round, the gaming device may select which of the scenarios to present to the player. A tour may thus allow a player to play one or more of any scenarios available in a bonus round. Accordingly, in some embodiments of the present invention, a player may pay a fee for each scenario played on a tour.

Figure 9:
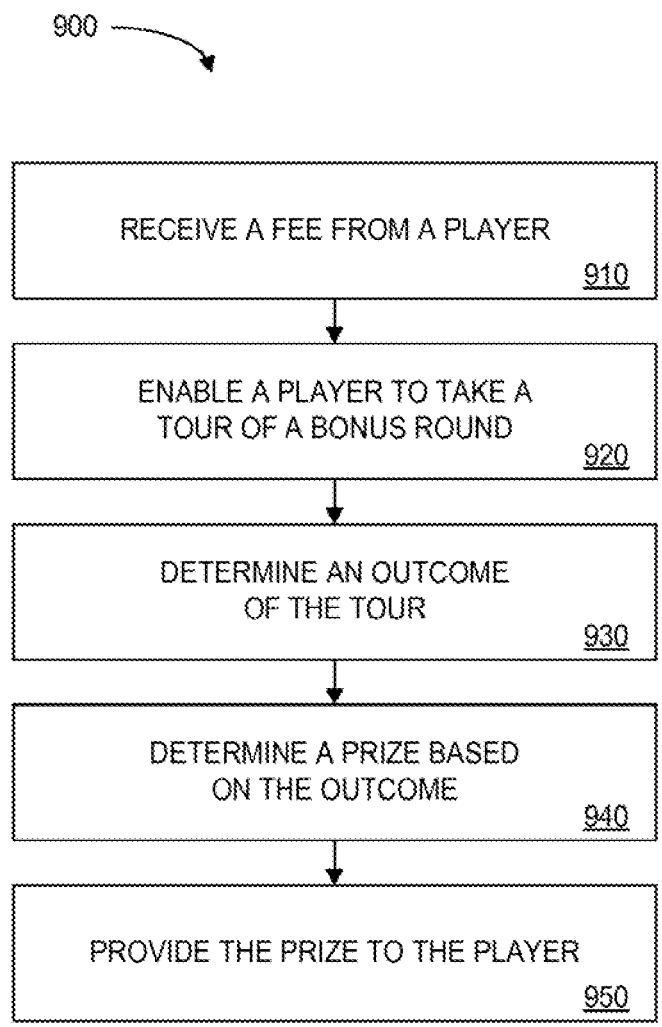
FIG. 9 is a flow chart representing an exemplary process of one or more embodiments of the present invention.

Referring to FIG. 9, a flow chart 900 represents an embodiment of the present invention that may be performed by a controller and/or a game machine, including, without limitation, a video poker machine, for enabling a player to take a tour of a bonus round.

In step 910, a controller 200 receives an indication of an entry fee from (or on behalf of) a player. For example, the controller 200 receives a signal from the game machine 300 indicating that the player has paid $5 for entry into a bonus round (e.g., using the payment system 312). According to various embodiments of the present invention, the entry fee may be received in response to an offer for a tour (or other prompt) communicated to the player. Receiving a fee from the player may comprise an acceptance of such an offer. According to other various embodiments, receiving the entry fee may comprise receiving a player identifier and/or a payment identifier, such as a financial account number.

In step 920, the controller 200 enables the player to take a tour of a bonus round. In some embodiments, the controller 200 may enable the player to take the tour based on the entry fee received. For example, the controller 200 may verify that the entry fee provided is adequate consideration in exchange for the tour. In another example, the controller 200 may enable the player to take a tour including a particular number of bonus and/or primary games, and/or for a particular period of time, based on the entry fee, as discussed herein. Various other ways in which the controller 200 may enable a player to take a tour of a bonus round are discussed herein. For example, the controller 200 may determine whether the player is eligible to take a tour.

In step 930, the controller 200 determines an outcome of the tour, as discussed further herein. In step 940, the controller 200 determines a prize based on the outcome. In step 950, the controller 200 provides the prize to the player.

As described variously herein, according to one or more embodiments, a player who is taking a tour of a bonus round may win a prize that is different from what the player would have received had he been playing an actual bonus round. During a normal bonus round (e.g., a bonus round that is entered by achieving a winning outcome in a qualifying round, not by taking a tour), a player may win a normal bonus round prize that would be provided to a player for achieving an outcome during the normal bonus round. During a tour of a bonus round, a player may win a tour prize that is provided to the player for achieving an outcome during the tour. A tour prize may or may not be equivalent to the normal bonus round prize that would be provided to a player for the same outcome during a normal bonus round. For example, as shown in the tabular representation 600 (FIG. 6) of the prize database 305, a tour prize 610 for hatching a baby chicken is "1 COIN", but the normal bonus round prize 606 for hatching a baby chicken is "10 COINS".

According to some embodiments of the present invention, a game machine 300 may output or otherwise communicate to a player (e.g., using an output device 310) an indication of a tour prize and/or an indication of a normal bonus round prize.

In some embodiments, a game machine 300 providing a tour may only output an indication of a tour prize. For example, a message may be displayed on a video screen of a "Golden Egg" slot machine that says, "You just won 1 coin for hatching a baby chicken." In other embodiments, the game machine 300 may only output an indication of a normal bonus round prize corresponding to an outcome (not the tour prize value). For example, an audio speaker may play a message, "In a bonus round, you would have won ten coins for hatching a baby chicken."

In still other embodiments, a game machine 300 may output an indication of both a tour prize and a normal bonus round prize corresponding to an outcome. For example, a message may be displayed on a video screen: "Since this slot machine is in tour mode, you win 1 coin for hatching a baby chicken. During a normal bonus round, you would win 10 coins for hatching a baby chicken!" Providing the player with an indication of both the tour prize and the normal bonus prize may help to avoid any confusion of the player, and may further motivate the player to continue to play the game machine once a tour mode is over.

Various other techniques for outputting messages, including lessons and information about prizes and outcomes, are described herein, and others may be readily apparent to those skilled in the art based on the present disclosure.

Figure 10:
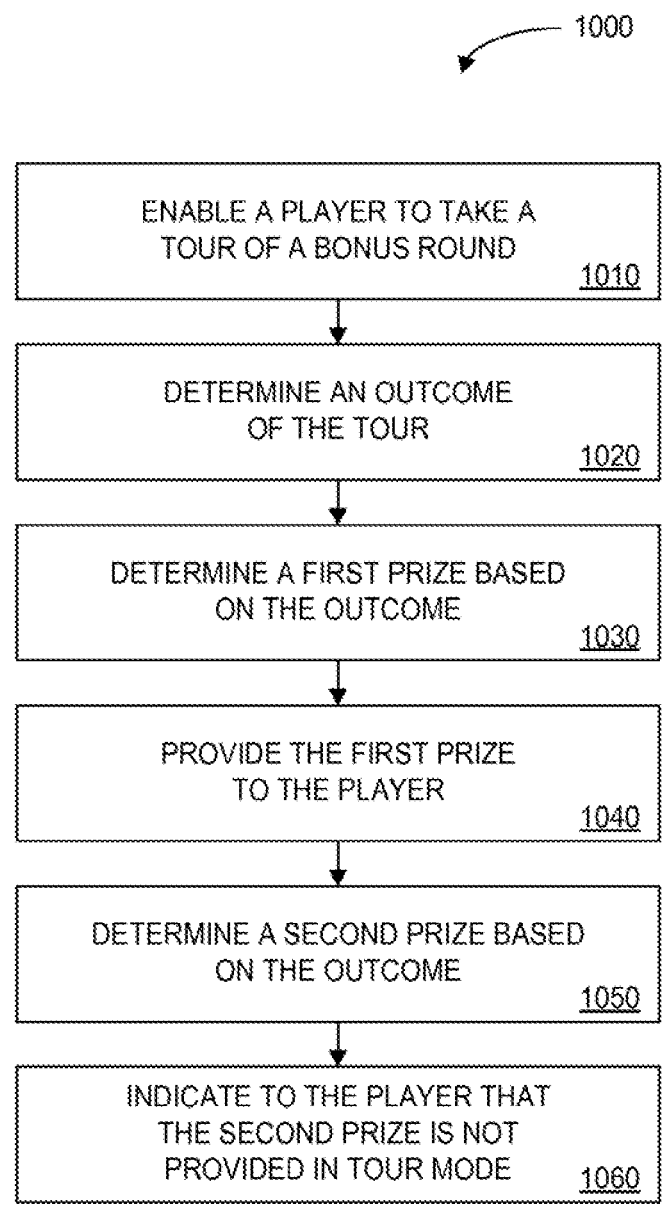
FIG. 10 is a flow chart representing an exemplary process of one or more embodiments of the present invention.

Referring to FIG. 10, a flow chart 1000 represents an exemplary embodiment of the present invention that may be performed by a controller and/or a game machine, including, without limitation, a slot machine, for enabling a player to take a tour of a bonus round.

In step 1010, a game machine 300 enables a player to take a tour of a bonus round, as discussed variously herein. In step 1020, the game machine 300 determines an outcome of the tour. In step 1030, the game machine 300 determines a first prize based on the outcome. For example, the game machine 300 may retrieve an entry in the prize database 305 that corresponds to the determined outcome, and determine prize data associated with a tour, such as prize during tour 610 (FIG. 6).

In step 1040, the game machine 300 provides the first prize to the player. For example, the game machine 300 instructs the game machine 300 to credit the player's balance in accordance with the determined tour prize. In step 1050, the controller determines a second prize. For example, the game machine 300 may retrieve an entry in the prize database 305 that corresponds to the determined outcome, and determine prize data associated with normal play of a bonus round, such as prize 606 (FIG. 6).

In step 1060, the game machine 300 indicates to the player that the second prize (e.g., the normal bonus round prize) is not provided in tour mode. The game machine 300 may also indicate to the player that the second prize is only provided during normal play of the bonus round. For example, the game machine 300 may provide a message as described herein, explaining the respective prize values and how they may each be achieved. Thus, a player may benefit from a prize during tour mode, and may also benefit from information about normal play of the bonus round.

Figure 11:
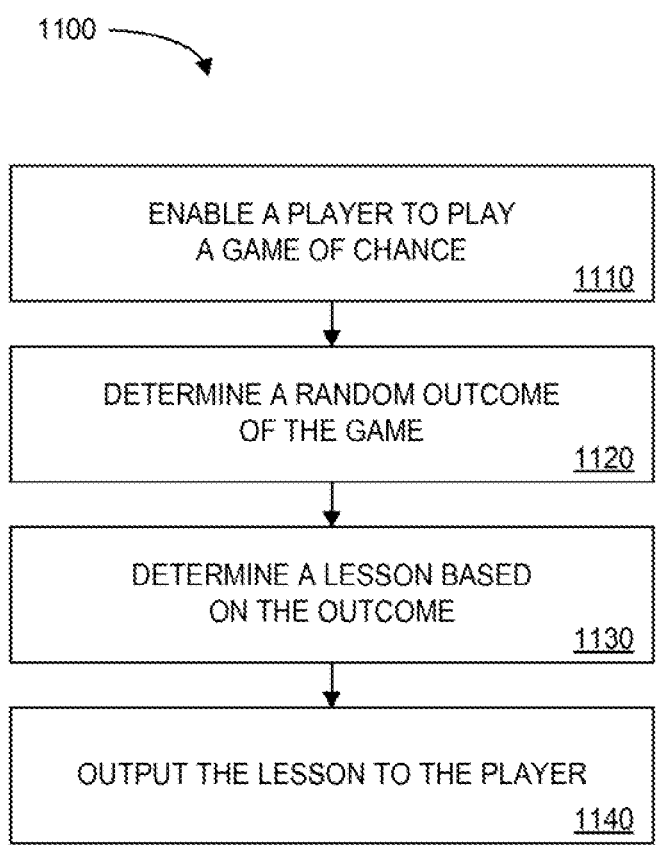
FIG. 11 is a flow chart representing an exemplary process of one or more embodiments of the present invention.

According to various embodiments of the present invention, one or more lessons may be communicated to a player while the player is playing a game machine. Referring to FIG. 11, a flow chart 1100 represents an exemplary embodiment of the present invention that may be performed by a controller and/or a game machine, including, without limitation, a slot machine, for outputting a lesson to a player.

In step 1110, a game machine enables a player to play a game of chance. For example, the game machine 300 determines that a player is eligible to take a tour including at least one secondary game (e.g., based on information received from the controller, and initiates the tour at the game machine 300. In step 1120, the game machine 300 determines a random outcome of the game of chance. For example, based on at least one random number (or pseudo-random number), the game machine 300 determines an outcome. As discussed herein, the game machine 300 may determine at random the location of the rabbit character in the "Rascally Rabbit" bonus game (e.g., which hole the rabbit is "hiding" in).

In step 1130, the game machine 300 determines a lesson based on the random outcome. For example, according to some embodiments, the game machine 300 may determine a lesson to output to a player using the lesson database 304, such as the one depicted in FIG. 5, which corresponds to the "Golden Egg" bonus game example. For instance, if the determined random outcome is "PLAYER FINDS THE GOLDEN EGG", then the controller may select the lesson, identified as "LESSON-123890-04" in FIG. 5, that corresponds to this outcome.

According to various embodiments of the present invention, a lesson may be, for example, a message that helps to inform and/or to teach a player the rules, operation, strategy, and/or entertainment value of a bonus round. Some examples of lessons that may instruct a player about the rules of a bonus round include, without limitation:

"If you crack open an egg with an alligator in it, the bonus round ends."
"Your bonus round is over. At the end of the bonus round, you get 10 coins for each chicken that you hatched."
"If you crack open an egg and find a golden egg, then you win 300 coins."
"If you find the golden egg, then your bonus round is over."
"If the "Wheel of Riches" lands on a Money icon, then you get to add that amount of money to your stash."
"If the "Wheel of Riches" lands on a Thief icon, then you lose all the money in your stash."
For the "Wheel of Riches" bonus round: "If you stop playing, then you get to keep all the money in your stash."
"You're only allowed one guess as to where the "Rascally Rabbit" is."

Examples of lessons that may instruct a player about the operation of a bonus round include, without limitation:

"Press the 'Cash out' button to end your bonus round and keep all the money in your stash."
"Press the 'Spin' button to spin the Wheel of Riches."
"To crack open an egg, use your finger to touch the egg on the touch screen."
"To guess where the "Rascally Rabbit" is, use your finger to touch a rabbit hole on the touch screen."

Examples of lessons that may instruct a player about the strategy of a bonus round include, without limitation:

For "Wheel of Riches": "If you build up a big stash of money, consider ending your bonus round. If you spin the wheel again, you might end on a Thief who will steal all your money."
For "Golden Egg": "To make the most money, you want to hatch all the chickens and then find the golden egg. This way, you get 10 coins for each chicken and 300 coins for the golden egg. If you crack open the "Golden Egg" first, you only get the 300 coins for the golden egg."

Examples of lessons that may instruct a player about the entertainment value of a bonus round include, without limitation:

For "Wheel of Riches": "This bonus round is all about pressing your luck. How daring are you? Are you willing to run the risk of having a thief steal your stash?"
For "Golden Egg": "Aren't the baby chickens cute? It's a great feeling to hatch open an egg and find a baby chicken inside."
For "Rascally Rabbit": "There are over 100 different rabbit animations. See if you can view them all!"

According to some embodiments, a lesson may be determined and/or output in response to a trigger. As discussed herein, a trigger is a stimulus, interrupt, condition, signal, criterion, exception, or other event that may occur. Some categories of triggers that may be used with lessons and/or other features of the present invention include, without limitation:

Game-related events. For example, a trigger may occur if a player hatches a chicken in the "Golden Egg" bonus round. In a second example, a trigger may occur if a player gets a Thief in the "Wheel of Riches" bonus round.
An indication provided by a player. For example, a player may provide an indication using an input device (e.g., a touch screen, a button). In a second example a trigger may occur if a player provides an inappropriate indication (e.g., a player presses the spin button when he is in the middle of a "Rascally Rabbit" bonus round.) In a third example, a video camera on a game machine may observe a player's facial expression to determine if the player is confused.
A time-related condition. For example, a trigger may occur if a player does not provide any indications for more than 15 seconds. (This may be an indication that the player is confused.)
A malfunction or emergency situation. For example, a trigger may occur if a slot machine jams, malfunctions, or is otherwise prevented from continuing play.

In step 1140, the game machine 300 outputs the lesson to the player. For example, if the controller has selected "LESSON-123890-04" based on the random outcome, then the game machine 300 may transmit the corresponding text, "IF THE YOU FIND THE GOLDEN EGG DURING A BONUS ROUND, THEN YOU WIN 100 COINS.", to the game machine 300 for output to the player (e.g., on a display device of the game machine 300).

According to one or more embodiments, a lesson may be output to a player using at least one output device 310 on a game machine 300. A lesson may be output to a player in a variety of ways. For example, a lesson may be output as text. For instance, the words "Press the 'Spin' button to spin the Wheel of Riches." may be displayed on a video screen. In another example, a lesson may have an audio component. For instance, a 'beep' sound may be output anytime a lesson is displayed on a video screen. In a second example, a recorded voice may describe a lesson to a player. According to one embodiment, a lesson may be output in audio form only and may not have a video component.

In another example, a lesson may have a video component. For example, an image or sequence of images may be displayed to a player that instruct the player on how to operate a slot machine in a bonus round. In yet another example, an animated movie may show a player how to play a game.

In some embodiments, a lesson may be displayed to a player using a partition or window. According to one embodiment, a partition may be a video screen or an area of a video screen that is used to display related information. Examples of partitions include: headers, footers, sidebars, windows, overlays, and pop-up windows. For example, when a game machine is in tour mode, a header may be overlaid across the top of a video screen. This header may display lessons to the player instructing him how to operate the game machine. In a second example, a sidebar may display strategy information to a player.

According to other embodiments, various visual cues may be used to draw a player's attention to a lesson that is displayed. Examples of visual cues include: color, fonts, highlighting, transparency, and animation. In some embodiments, an avatar, virtual assistant, or other on-screen character may be displayed to a player in conjunction with a lesson. For example, an animated rabbit may be displayed on video screen and provide advice to a player on playing the "Rascally Rabbit" bonus round. Advice from the rabbit may be provided as text (e.g., displayed using a speech bubble as a partition), or as audio (e.g., an audio recording may be played, allowing the rabbit to "speak" to the player), or both.

Systems, apparatus and computer program products are provided for carrying out the embodiments described herein as well as numerous other embodiments of the present invention. Each computer program product described herein may be carried by a medium readable by a computer (e.g., a carrier wave signal, a floppy disc, a hard drive, a random access memory, etc.).

Additional Embodiments

Various embodiments of the present invention are discussed herein with reference to tours of bonus rounds or other secondary games. Alternatively, or in addition, a player may be able to take a tour including play of a primary game (e.g., including one or more handle pulls) on a game machine. In one or more embodiments related to a slot machine, for example, the player may pay a fee for a package of ten reel spins, in which the normal payouts for such spins may be reduced, as described herein with respect to bonus rounds.

Tours of reel spins, for example, could provide further explanation and demonstrations of various information about the primary game, including, without limitation: (i) how to increase/decrease a bet per line, (ii) how to enable more/fewer lines per reel spin, (iii) what the prizes are for various reel combinations, (iv) what symbols or combination of symbols are required for qualification to a bonus round, (v) how scatter pays work, (vi) how wild card symbols work, (vii) how reel symbols may interact with other reel symbols, and (viii) whether or not the reel symbols on a payline pay right to left or left to right. Those of skill in the art will appreciate that there are many such opportunities to provide clarification to the slot machine player with regard to reel spins.

In one or more alternative embodiments, a package tour may include any number of different types of outcomes. For example, a tour of ten spins may include at least one spin which qualifies for a scatter pay, at least one spin that qualifies for a bonus round, and at least one spin that ordinarily pays out a large number of coins (although during the tour this amount could be dramatically reduced, or even set to zero). Thus, the player taking the tour may develop a better feel for how the game is played and is provided the opportunity to witness reel spin outcomes that may ordinarily be infrequent.

According to one or more embodiments of the present invention, as discussed herein, a tour may include a plurality of bonus rounds and/or one or more secondary games. Allowing player to play a plurality of bonus rounds may help to accustom the player to the game and motivate him to continue playing the game once the tour is over. For example, a tour of the "Golden Egg" bonus round may allow a player to play three bonus rounds. Each bonus round may have a new set of eggs and be completely independent of another previous round. In another example, a tour of the "Rascally Rabbit" bonus round may include five rounds of the "Rascally Rabbit" secondary game. In each round, the player may have a chance to guess where the rabbit is hiding.

According to some embodiments of the present invention, a tour may end when a trigger occurs. For example, a tour may last for a limited number of bonus rounds (e.g., three rounds), or a tour may last for a limited amount of time (e.g., five minutes). In another example, a tour may end when a set of game events has occurred. For instance, a tour of the "Golden Egg" bonus round may not end until the player has hatched at least one baby chicken and at least one alligator. In another example, a tour of the "Wheel of Riches" bonus round may not end until (i) a player has had his stash stolen by a thief at least once, and/or (ii) a player has cashed out his stash at least once.

In another example, a tour may end once a set of one or more lessons has been output. For instance, a tour of the "Golden Egg" bonus round may not end until lessons "LESSON-123890-01", "LESSON-123890-02", and "LESSON-123890-03" have been output to a player. In yet another example, a tour may not end until a player has won a certain amount of money (e.g., $5). Such embodiments may be particularly helpful in encouraging players to take tours. For example, a game machine may advertise to players, "We GUARANTEE that you'll win $5 during this tour of the "Wheel of Riches" game machine,"

Other types of triggers are discussed herein, and others will be readily apparent to those skilled in the art in light of the present disclosure. According to various embodiments of the present invention, determining that a trigger has occurred may include evaluating a Boolean expression.

As discussed herein, a player may purchase a package that includes a tour and at least one game in regular mode (i.e., not in tour mode). For example, after a player has taken a tour of the "Golden Egg" bonus round, he may be given ten credits to play the "Golden Egg" game normally (e.g., by playing the primary game and potentially gaining entry to a bonus round through a qualifying outcome). According to one embodiment, a game machine may automatically switch to regular mode after a tour is over.

According to various embodiments, the controller 200 may determine a cost of providing a tour to a player. This cost may be based on various factors, including, without limitation, an expected value of prizes awarded during a tour, an actual value of prizes awarded during a tour, and an opportunity cost for the time taken by a tour. For example, if a tour takes fifteen minutes, then the opportunity cost of these fifteen minutes may be determined based on how much money could have been made by the game machine if the game machine had been operating in regular mode during those fifteen minutes.

According to some alternative embodiments, a company (e.g., a merchant, a vendor, a game manufacturer) may sponsor a player taking a tour (e.g., by paying for at least a portion of the cost of the tour). For example, a slot machine manufacturer may sponsor a player taking a tour on a new type of slot machine. A slot machine manufacturer may want to gain market share for its game machine. Giving players tours of the slot machine may help players to understand how the slot machine works and make the game more enticing to players. This in turn may result in more players playing the game and a greater market share for the slot machine manufacturer. In another example, a casino may want to entice players to play a new type of video poker machine (e.g., in which the machine has a higher house edge). Giving players tours of the slot machine may help players to understand how the new video poker machine works, and may make the game more enticing to players. This in turn may result in more players playing the video poker machine (and potentially greater revenues for the casino).

According to one or more embodiments, a company sponsoring a tour by a player may provide consideration to a casino or other party that owns, rents, or operates the slot machine. This consideration may be based on a cost of the tour, as well as on other factors relating to the ownership, rental, or usage of the game machine. According to one embodiment, the controller 200 may be in communication with a sponsor database (not shown) for storing and tracking how much money a particular sponsor owes to a casino.

According to one alternative embodiment, a plurality of players may simultaneously take a tour on a slot machine. For example, the players may provide a plurality of player identifiers, or one or more of the players may provide a group identifier (e.g., a tour group name and number). A tour may be initiated after (or in response to) receiving the group identifier or the plurality of player identifiers, in a manner described herein.

According to one or more alternative embodiments of the present invention, in addition to or in lieu of determining whether a player is eligible for a tour, the controller 200 and/or the game machine 300 may determine whether a player is eligible to win a prize. For example, in some embodiments a player may be able to take a tour as many times as he wants, but may be eligible to win prizes only once. Accordingly, if a player takes a tour additional times, he may still play the game and view lessons, but no prizes will be paid out (although the player may be notified of one or more prize values corresponding to an achieved outcome, as discussed herein). One advantage of such embodiments is that a player may be able to retake a tour (e.g., because he forgot how to play a game), but the casino can advantageously limit the risk that the casino will lose money because a player wins prizes multiple times. In another alternative embodiment, the controller 200 may determine whether a player is eligible to win a reduced prize (e.g., if he takes a tour multiple times).

According to some alternative embodiments, tour mode on one or more game machines may be disabled based on a condition or trigger. Disabling a tour may include, for example, preventing a player from initiating a tour, and/or not advertising tours to nearby players (e.g., disabling an attract or prompt mode for the tour). An operator of a game machine may find it desirable to be able to disable a tour when the promotional advantages of the tour (e.g., for encouraging additional players to play a game machine) may not be necessary (e.g., when there is clearly a high level of demand for the game machine), or may be limited or outweighed by the costs of providing the tour. For example, a casino may establish a condition (e.g., stored in a database) that tours on "Golden Egg" slot machines should be disabled if more than 90% of all "Golden Egg" slot machines are in use. The controller 102 may monitor the usage of the "Golden Egg" slot machines to determine the level of usage, and may disable the tour if the condition is met. In another example, tours on "Wheel of Riches" slot machines may be disabled by a casino between the hours of 8 pm and 11 pm (e.g., peak hours for gambling), because the casino knows (e.g., by tracking information about the slot machines) that players of "Wheel of Riches" slot machines historically tend to operate the machines in regular mode during these hours anyway, and the machines generate greater revenues in regular mode than they do in tour mode.

Various embodiments of the present invention provide for displaying or otherwise indicating to a player that a machine is in tour mode. The indication that a game machine is in tour mode may be displayed at one or more times, including, without limitation, for the entire duration of a tour, at a time an outcome is displayed to a player (e.g., while the reels on a slot machine are spinning, when the reels on a slot machine stop spinning), at the start of a tour (e.g., when a player provides payment for a tour, when the tour is initiated), and when a prize is won.

Some players may find it beneficial to be informed or reminded that the player may be playing according to one or more modifications or variations of a secondary game. For example, Applicants recognize that some players may become confused and think that a game machine is operating in regular mode when it is in fact operating in tour mode. For example, a player may win a jackpot when operating a game machine in tour mode. According to some embodiments, a jackpot won during tour mode may pay out a reduced prize value. If a player does not realize that the game machine is in tour mode, then he may become angry or disappointed that he only receives the reduced prize for the jackpot. A casino employee may then have to explain to the player that the game machine was in fact in tour mode when the player achieved that outcome.

In order to avoid unfortunate circumstances like the example above, a game machine may indicate to a player that it is in tour mode. Examples of indications that may be provided by a game machine include, without limitation:

The words "No Action" may be superimposed over the reels of a video slot machine.

The words "Tour Mode" may be displayed using a neon sign on a video blackjack machine.

A message may be displayed to a player. For example: "This slot machine is in tour mode. In tour mode, you may learn about how to play a bonus round, but are not eligible for some prizes. To operate this slot machine in regular mode instead, please press the 'STOP' button."

A portion of the payout table for a game machine may be hidden, not displayed, or otherwise removed from the view of the player.

A game machine may output an indication that it is in tour mode using an output device (e.g., a display device, an audio speaker).

Other types of indications that a game machine is in tour mode are discussed herein, and other indications may be readily apparent to those skilled in the art in light of the present disclosure.

In some embodiments of the present invention, at least one input and/or output device that was not activated during play of a qualifying round may be activated during play of a bonus round. For example, the exemplary "Wheel of Riches" slot machine may have a roulette-style wheel that is only used in the bonus round portion of the game (e.g., for determining a bonus prize).

Accordingly, while the present invention has been disclosed in connection with the exemplary embodiments thereof, it should be understood that other embodiments may fall within the spirit and scope of the invention as defined by the following claims.

The invention is claimed as follows:

1. A gaming system comprising:
   at least one input device;
   at least one display device;
   at least one processor; and
   at least one memory device which stores a plurality of instructions, which when executed by the at least one processor, cause the at least one processor to operate with the at least one display device and the at least one input device to:
   (a) for each of a quantity of at least two plays of a wagering game:
      (i) enable a player to place a wager on the play of the wagering game;
      (ii) generate a wagering game outcome from a plurality of different wagering game outcomes,
      (iii) display the generated wagering game outcome,
      (iv) determine any wagering game award associated with the generated wagering game outcome, and
      (v) display any determined wagering game award associated with the generated wagering game outcome,
   (b) for each of any of the quantity of plays of the wagering game associated with a bonus game triggering event, for at least one play of a bonus game:
      (i) generate a bonus game outcome from a plurality of different bonus game outcomes,
      (ii) display the generated bonus game outcome,
      (iii) determine any bonus game award associated with the generated bonus game outcome, and
      (iv) display any determined bonus game award associated with the generated bonus game outcome, and
   (c) when none of the quantity of at least two plays of the wagering game are associated with the bonus game triggering event, for at least one tour of the bonus game:
      (i) generate a bonus game tour outcome from a plurality of different bonus game tour outcomes,
      (ii) display the generated bonus game tour outcome,
      (iii) determine a bonus game tour award, said determination based, at least in part, on the generated bonus game tour outcome, and
      (iv) display any determined bonus game tour award.

2. The gaming system of claim 1, wherein one of the quantity of plays of the wagering game is associated with the bonus game triggering event if a designated wagering game outcome is generated.

3. The gaming system of claim 2, wherein none of the quantity of plays of the wagering game are associated with the bonus game triggering event if no wagering designated game outcomes are generated.

4. The gaming system of claim 1, wherein when executed by the at least one processor, the plurality of instructions cause the at least one processor to enable the player to pay a fee and if the player pays the fee and none of the quantity of plays of the wagering game are associated with the bonus game triggering event, execute (c)(i) to (c)(iv) for at least one tour of the bonus game.

5. The gaming system of claim 4, wherein the fee is associated with a designated wager placed on each of the quantity of plays of the wagering game.

6. The gaming system of claim 1, wherein when executed by the at least one processor, the plurality of instructions cause the at least one processor to, for the at least one tour of the bonus game, determine the bonus game tour award based, at least in part, on an amount of wagers placed on the quantity of plays of the game.

7. The gaming system of claim 1, wherein the plurality of different bonus game outcomes and the plurality of different bonus game tour outcomes are the same plurality of different outcomes.

8. The gaming system of claim 1, wherein the plurality of different wagering game outcomes, the plurality of different bonus game outcomes and the plurality of different bonus game tour outcomes are the same plurality of different outcomes.

9. The gaming system of claim 1, wherein at least one of any determined wagering game award, any determined bonus game award and any determined bonus game tour award is selected from the group consisting of: a quantity of monetary credits, a quantity of non-monetary credits, a quantity of promotional credits, and a quantity of player tracking points.

10. The gaming system of claim 1, wherein the at least one play of the bonus game includes at least one free generation of a plurality of reel symbols.

11. The gaming system of claim 10, wherein the at least one tour of the bonus game includes at least one free generation of the plurality of reel symbols.

12. A method of operating a gaming system, said method comprising:
   (a) for each of a quantity of at least two plays of a wagering game:
      (i) enabling a player to place a wager on the play of the wagering game;
      (ii) causing at least one processor to execute a plurality of instructions to generate a wagering game outcome from a plurality of different wagering game outcomes,
      (iii) causing at least one display device to display the generated wagering game outcome,
      (iv) causing the at least one processor to execute the plurality of instructions to determine any wagering game award associated with the generated wagering game outcome, and
      (v) causing the at least one display device to display any determined wagering game award associated with the generated wagering game outcome,
   (b) for each of any of the quantity of plays of the wagering game associated with a bonus game triggering event, for at least one play of a bonus game:

(i) causing the at least one processor to execute the plurality of instructions to generate a bonus game outcome from a plurality of different bonus game outcomes,
(ii) causing the at least one display device to display the generated bonus game outcome,
(iii) causing the at least one processor to execute the plurality of instructions to determine any bonus game award associated with the generated bonus game outcome, and
(iv) causing the at least one display device to display any determined bonus game award associated with the generated bonus game outcome, and
(c) when none of the quantity of at least two plays of the wagering game are associated with the bonus game triggering event, for at least one tour of the bonus game:
(i) causing the at least one processor to execute the plurality of instructions to generate a bonus game tour outcome from a plurality of different bonus game tour outcomes,
(ii) causing the at least one display device to display the generated bonus game tour outcome,
(iii) causing the at least one processor to execute the plurality of instructions to determine a bonus game tour award, said determination based, at least in part, on the generated bonus game tour outcome, and
(iv) causing the at least one display device to display any determined bonus game tour award.

13. The method of claim 12, wherein one of the quantity of plays of the wagering game is associated with the bonus game triggering event if a designated wagering game outcome is generated.

14. The method of claim 13, wherein none of the quantity of plays of the wagering game are associated with the bonus game triggering event if no wagering designated game outcomes are generated.

15. The method of claim 12, which includes enabling the player to pay a fee and if the player pays the fee and none of the quantity of plays of the wagering game are associated with the bonus game triggering event, executing (c)(i) to (c)(iv) for at least one tour of the bonus game.

16. The method of claim 15, wherein the fee is associated with a designated wager placed on each of the quantity of plays of the wagering game.

17. The method of claim 12, which includes, for the at least one tour of the bonus game, causing the at least one processor to execute the plurality of instructions to determine the bonus game tour award based, at least in part, on an amount of wagers placed on the quantity of plays of the game.

18. The method of claim 12, wherein the plurality of different bonus game outcomes and the plurality of different bonus game tour outcomes are the same plurality of different outcomes.

19. The method of claim 12, wherein the plurality of different wagering game outcomes, the plurality of different bonus game outcomes and the plurality of different bonus game tour outcomes are the same plurality of different outcomes.

20. The method of claim 12, wherein at least one of any determined wagering game award, any determined bonus game award and any determined bonus game tour award is selected from the group consisting of: a quantity of monetary credits, a quantity of non-monetary credits, a quantity of promotional credits, and a quantity of player tracking points.

21. The method of claim 12, wherein the at least one play of the bonus game includes at least one free generation of a plurality of reel symbols.

22. The method of claim 21, wherein the at least one tour of the bonus game includes at least one free generation of the plurality of reel symbols.

23. The method of claim 12, which is provided through a data network.

24. The method of claim 23, wherein the data network is an internet.

* * * * *

UNITED STATES PATENT AND TRADEMARK OFFICE
CERTIFICATE OF CORRECTION

PATENT NO. : 8,882,584 B2  
APPLICATION NO. : 13/762047  
DATED : November 11, 2014  
INVENTOR(S) : Jay S. Walker et al.

Page 1 of 1

It is certified that error appears in the above-identified patent and that said Letters Patent is hereby corrected as shown below:

IN THE CLAIMS

In Claim 3, Column 32, Line 7, delete "wagering".
In Claim 3, Column 32, Line 7, between "designated" and the second instance of "game" insert --wagering--.
In Claim 4, Column 32, Line 14, between "for" and "at" insert --the--.
In Claim 6, Column 32, Line 24, between "the" and "game" insert --wagering--.
In Claim 14, Column 33, Line 35, delete "wagering".
In Claim 14, Column 33, Line 35, between "designated" and the second instance of "game" insert --wagering--.
In Claim 15, Column 34, Line 1, after "for" insert --the--.
In Claim 17, Column 34, Line 10, between "the" and "game" insert --wagering--.

Signed and Sealed this  
Tenth Day of November, 2015

Michelle K. Lee  
*Director of the United States Patent and Trademark Office*